US006725108B1

(12) United States Patent
Hall

(10) Patent No.: US 6,725,108 B1
(45) Date of Patent: Apr. 20, 2004

(54) SYSTEM AND METHOD FOR INTERPRETATION AND VISUALIZATION OF ACOUSTIC SPECTRA, PARTICULARLY TO DISCOVER THE PITCH AND TIMBRE OF MUSICAL SOUNDS

(75) Inventor: Shawn Anthony Hall, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,324

(22) Filed: Jan. 28, 1999

(51) Int. Cl.[7] ............................ G10G 1/00; G10G 1/04; G10G 3/04; H04R 29/00; G06F 3/16

(52) U.S. Cl. ......................... 700/94; 381/56; 84/470 R; 84/477 R

(58) Field of Search ......................... 381/56; 84/477 R; 700/94

(56) References Cited

U.S. PATENT DOCUMENTS

| | | | | |
|---|---|---|---|---|
| 3,681,530 A | | 8/1972 | Manley et al. | 704/203 |
| 3,932,737 A | * | 1/1976 | Delepine | 702/76 |
| 4,100,604 A | | 7/1978 | Perrault | 708/821 |
| 4,106,103 A | | 8/1978 | Perreault | 708/821 |
| 4,510,840 A | * | 4/1985 | Inami et al. | 84/477 R |
| 4,539,518 A | | 9/1985 | Kitayoshi | 702/124 |
| 4,546,690 A | * | 10/1985 | Tanaka et al. | 84/477 R |
| 4,771,671 A | * | 9/1988 | Hoff, Jr. | 84/645 |
| 4,856,068 A | | 8/1989 | Quatieri, Jr. et al. | 381/106 |
| 5,048,390 A | * | 9/1991 | Adachi et al. | 84/464 R |
| 5,196,639 A | | 3/1993 | Lee et al. | 84/603 |
| 5,615,302 A | * | 3/1997 | McEachern | 704/209 |

OTHER PUBLICATIONS

Soloists for Windows, Ibis Software, San Francisco, CA, (No date) p. 1.
Soloist for Windows, Ibis Software, San Francisco, CA.

* cited by examiner

*Primary Examiner*—Minsun Oh Harvey
*Assistant Examiner*—Tony M. Jacobson
(74) *Attorney, Agent, or Firm*—Thomas A. Beck; Louis P. Herzberg

(57) ABSTRACT

The invention comprises a transducer, computer hardware, and software. The computer hardware contains a waveform-input device. The transducer (such as a microphone) converts a signal (such as sound waves) into a time-varying voltage. The waveform-input device periodically samples this voltage and digitizes each sample, thereby producing an array of N numbers in the memory of the computer that represent a small snippet of the signal measured over a time interval $\Delta t_{meas}$. Snippets are typically measured one after the other at a repetition rate that is inversely related to $\Delta t_{meas}$. The software, also stored in the memory of the computer, and executed using its central processing unit, includes a spectral-analysis process that analyzes the frequency content of each snippet and produces an associated spectrum. The software also includes a novel note-analysis process that analyzes the spectrum and extracts from it the pitch and timbre of the principal musical note contained therein. The process works for any spectrum, including cases where the fundamental frequency of the note is missing. The software further includes novel processes to visualize graphically the pitch and the timbre.

19 Claims, 13 Drawing Sheets

SYSTEM AND METHOD FOR INTERPRETATION AND VISUALIZATION OF ACOUSTIC SPECTRA, PARTICULARLY TO DISCOVER THE PITCH AND TIMBRE OF MUSICAL SOUNDS

FIELD OF THE INVENTION

The invention relates to the analysis and understanding of acoustic spectra, particularly the spectra of musical sounds. More specifically, the invention relates to the extraction of pitch and timbre from the spectra of musical sounds.

BACKGROUND OF THE INVENTION

Musicians and others (piano tuners, acousticians) are often concerned with evaluating musical sounds in real time, particularly with regard to pitch and tone quality (timbre). During training, rehearsal, and performance, both singers and instrumentalists make these evaluations continuously, and adjust their technique accordingly to improve the sound. Music teachers, orchestral conductors and choral directors make similar evaluations, and by gesture or verbal instruction indicate how performance should be improved.

In all of these endeavors, the human ear and brain are used to evaluate the sound. Although this mechanism is necessary during performance, and marvelous for judging the "higher" qualities of music such as "expressiveness", it is hardly ideal for evaluating purely mechanical aspects of sound such as pitch and timbre, because human judgment is subjective. This problem is particularly acute for performing musicians, because the person evaluating the sound is busy producing it. Thus singers and instrumentalists often sing and play off-key while swearing they are in tune, or produce a poor tone quality (timbre) while imagining they are producing a good one.

The tendency to misjudge can be remedied by training, but in the absence of a teacher, in the hours practicing alone, there is typically no objective measure of pitch and timbre. Several techniques may be used but have limitations and drawbacks. For example, a keyboard instrument may be used intermittently to check pitch, but it dos not give continuous pitch feedback to the musician, and says nothing about timbre. Alternatively, recording and playing back may be used to separate the process of sound production from that of sound evaluation, but this is tedious because it is not real time.

To solve these problems, a mechanism is needed to provide real-time visual feedback of pitch and timbre to the musician, based on objective and consistent measurements. Visual feedback is ideal because does not interfere with the auditory feedback that the musician must ultimately use in performance. Rather, the visual feedback should help train the auditory system by showing the musician when pitch and tone quality are good. A personal-computer-based software tool would be ideal, since it is flexible, improves automatically as computer technology progresses, and avoids the cost of dedicated instrumentation.

PROBLEMS WITH THE PRIOR ART

To analyze sound, particularly musical sound, it is essential to begin, as the ear does, with a spectral analysis. All subsequent analysis, such as the extraction of pitch and timbre, depends on the spectral analysis. Yet, as shown below, it is at this fundamental level of spectral analysis that the prior art is deficient. The prior art's technique for doing spectral analysis is the Discrete Fourier Transform (DFT), and its efficient implementation known as the Fast Fourier Transform (FFT). See *Numerical Recipes in C; The Art of Scientific Computing*, William H. Press, Brian P. Flannery, et. al., Cambridge University Press, 1988, ISBN 0-521-35465-X, pp. 403–418, which is herein incorporated by reference in its entirety.

To demonstrate the deficiency of the DFT, it is helpful to summarize some of the mathematics involved. Using the DFT, a signal g(t) (e.g. sound pressure as a function of time) is windowed by a windowing function W(t), such as the Welch Window, which is defined to be non-zero only over the time interval $[0, \Delta t]$.

The windowed function $$\hat{g}(t) \equiv g(t)W(t) \tag{1}$$

is sampled at N discrete times in the interval $[0, \Delta t]$, namely $$t_n \equiv \frac{n}{S} = \frac{n}{N}\Delta t, \quad n = 0, \ldots, N-1, \tag{2}$$

where S is the sampling rate in Hz. Therefore the total time to measure the N-fold ensemble of samples is $$\Delta t_{meas} = \frac{N}{S}. \text{ (Sound-measurement time)} \tag{3}$$

Furthermore, using the DFT, the frequency content of $\hat{g}(t)$ at frequency f, given by $$\hat{G}(f) = \frac{1}{S}\sum_{n=0}^{N-1} \hat{g}(t_n)e^{2\pi i f t_n}, \tag{4}$$

is evaluated only at certain discrete values of the frequency f namely at the values $$f_k \equiv \frac{S}{N}k, \quad k = -\frac{N}{2}, \ldots, \frac{N}{2}. \tag{5}$$

(5)

Therefore the frequency granularity of the DFT (the difference between two adjacent frequencies, $f_{k+1}-f_k$), is $$\Delta f = \frac{S}{N}. \text{ (Frequency granularity for } DFT) \tag{6}$$

The deficiency of the DFT is summarized by equations (3) and (6), which together imply that $$\Delta f\, \Delta t_{meas} = 1. \text{ (Property of Discrete Fourier Transform)} \tag{7}$$

That is, with the DFT, it is impossible to achieve both a short sound-measurement time $\Delta t_{meas}$ and a fine frequency granularity $\Delta f$ . For example, if it is desired to have a short sound-measurement time of 0.1 seconds, then (7) implies that $\Delta f$ must assume the rather coarse value of 10 Hz. Conversely, if a fine frequency granularity of 1 Hz is desired, $\Delta t_{meas}$ must assume the large value of 1 second. In light of equation (7), it may be concluded that the DFT is inadequate for applications requiring both real-time data acquisition and precise spectral analysis in real time, because such applications require both small $\Delta t_{meas}$ and small $\Delta f$.

For example, in applications where musical sound need to be measured and analyzed in real time, small $\Delta t_{meas}$ is necessary to achieve the "real-time" objective. In particular, since fast musical notes are on the order of 80 to 100 milliseconds in length, the application demands $$\Delta t_{meas} \leqq 0.1 \text{ seconds.} \quad (8)$$

For the same type of application, small Δf (frequency granularity) is necessary to achieve accurate results in the computation of pitch. The frequency ratio between two musical notes a half-step apart on the equally tempered scale is $$\frac{f_+}{f} = \sqrt[12]{2}, \quad (9)$$

where $f_+$ is the upper of the two notes and f is the lower of the two notes. Thus the frequency difference between two notes a half-step apart is $$\Delta f_{halfstep} = f\left(\sqrt[12]{2} - 1\right). \quad (10)$$

For example, at C131 (i.e. 131 Hz, a note in the middle of the range of a human baritone voice), $\Delta f_{halfstep}$ is 7.8 Hz. Thus to achieve good pitch resolution of, say, an eighth of a half step, the application demands roughly $$\Delta f \leqq 1 \text{ Hz.} \quad (11)$$

Thus, the requirements of such an application with regard to data-acquisition time and frequency granularity, typified by equations (8) and (11), are an order of magnitude more demanding than the capability (7) offered by the DFT. Therefore the DFT is inadequate for such applications, and any prior art that uses it is likewise inadequate. This inadequacy is not dependent on the speed of the computer used to implement the DFT; even if the computer were infinitely fast, the inadequacy would remain the same, because it is inherent in the DFT algorithm itself.

Because the prior art is thus deficient in its ability to perform real-time data acquisition and finely-resolved spectral analysis simultaneously, it is therefore also deficient in its ability to perform accurate, real-time "note analysis", wherein the pitch and timbre of the sound are extracted, since note analysis uses the output of spectral analysis as its starting point.

PC Programs to acquire and analyze sounds using the DFT certainly exist, such as *CoolEdit* by Syntrillium Software and *Spectrum Analysis* by Sonic Foundary. However, these programs are not typically aimed at real-time applications, and make no attempt to extract pitch and timbre information. As such, they fail to provide useful information to a musician or other user requiring instantaneous, continuous feedback on the pitch and quality of live sound.

One PC program aimed specifically at musicians is Soloist by Ibis Software. This program provides nothing related to timbre feedback. Moreover it provides only a limited form of pitch feedback; for example, it cannot distinguish notes an octave apart. Furthermore the pitch feedback is not truly "real-time"; only one sound sample is analyzed per metronome beat.

OBJECT OF THE INVENTION

An object of this invention is a system and method for analyzing the frequency spectrum of a signal in real time, particularly the spectrum of an acoustic signal having a musical nature, the method providing real-time means to identify the pitch and timbre of the musical note represented by the spectrum, and also providing means to visualize the pitch and timbre, thereby providing real-time visual feedback of musical sounds, particularly to singers and instrumental musicians.

SUMMARY OF THE INVENTION

The invention comprises a transducer, computer hardware, and software. The computer hardware may be a standard, IBM-compatible Personal Computer containing a waveform-input device, such as a Creative Labs' SoundBlaster™ or equivalent. The transducer (such as a microphone) converts a signal (such as sound waves) into a time-varying voltage. The waveform-input device periodically samples this voltage and digitizes each sample, thereby producing an array of N numbers in the memory of the computer that represent a small snippet of the signal measured over a time interval $\Delta t_{meas}$. Snippets are typically measured one after the other at a repetition rate that is inversely related to $\Delta t_{meas}$. The software, also stored in the memory of the computer, and executed using its central processing unit, includes a spectral-analysis process that analyzes the frequency content of each snippet and produces an associated spectrum. The software also includes a novel note-analysis process that analyzes the spectrum and extracts from it the pitch and timbre of the principal musical note contained therein. The process works for any spectrum, including cases where the fundamental frequency of the note is missing. The software further includes novel processes to visualize graphically the pitch and the timbre.

DETAILED DESCRIPTION OF THE INVENTION

In a preferred embodiment, the system described in FIGS. 1 through 10 is used for real-time signal acquisition and spectral analysis. This system is further disclosed and claimed in U.S. Patent Application XXX, entitled "System and Method for Real-Time Signal Acquisition and Spectral Analysis, Particularly for Musical Sounds" to Hall, which is filed on the same day as this disclosure and herein incorporated by reference in its entirety.

Figure 1:
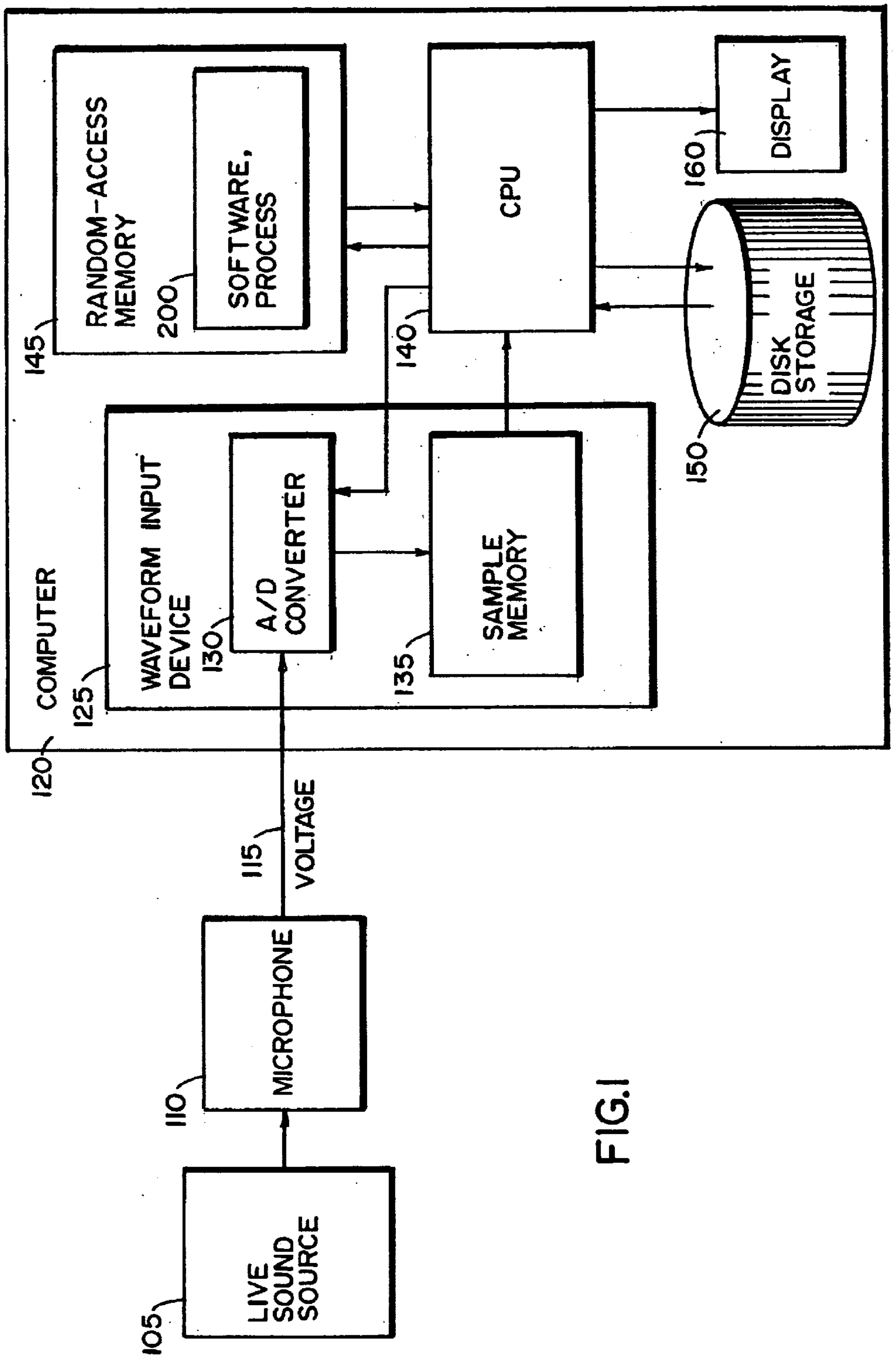
FIG. 1 is a block diagram of one preferred embodiment of the present invention.

FIG. 1 is a block diagram of one preferred embodiment of the present invention. Sound from a live sound source 105, such as a human voice, musical instrument or other vibrating object, is converted to a time-varying electrical voltage 115 using a microphone 110, such as a Shure BG 4.0, or other appropriate transducer, and this voltage 115 is connected to the computer 120, for example an IBM-Compatible Personal Computer containing a Waveform Input Device 125 such as a Creative Labs' SoundBlaster™ or equivalent. In an alternative embodiment, the voltage 115 is provided by the line output of a tape recorder playing a pre-recorded tape, or by the line output of a compact-disc player playing a pre-recorded disc. In yet another embodiment, the voltage 115 is provided by the line output of an electronic musical instrument, or by the output of an accelerometer attached to a vibrating object. Any voltage representing a vibration is contemplated.

In addition to the Waveform Input Device 125, the computer 120 comprises a central-processing unit (CPU) 140 such as an Intel Pentium processor, a random-access memory 145, a magnetic disk 150, and a video display 160. The random-access memory stores a software process 200 executed by the CPU; details of this process will be described below. The Waveform Input Device includes an Analog-to-Digital (A/D) Converter 130 that is capable of periodically sampling the time-varying voltage 115 at S samples per second, where S is typically either 8000, 11025, 22050, or 44100. The A/D converter 130 converts each sampled voltage to a signed integer having B bits of precision, and stores it either in the sample memory 135 or in the random-access memory 145. Typically, either B=8 (i.e. each signed integer is in the range −127 to +128), or B=16 (i.e. each signed integer is in the range −32767 to +32768). To obtain data that accurately reflect the sound source, it is important to strive for the highest possible signal-to-noise ratio at the input to the A/D Converter, by means of shielded cables and appropriate amplification if necessary. For example, if the A/D Converter digitizes to 16 bits (i.e. B=16), then a peak ambient-noise level less than ±3000 A/D units is preferred.

Figure 2A:
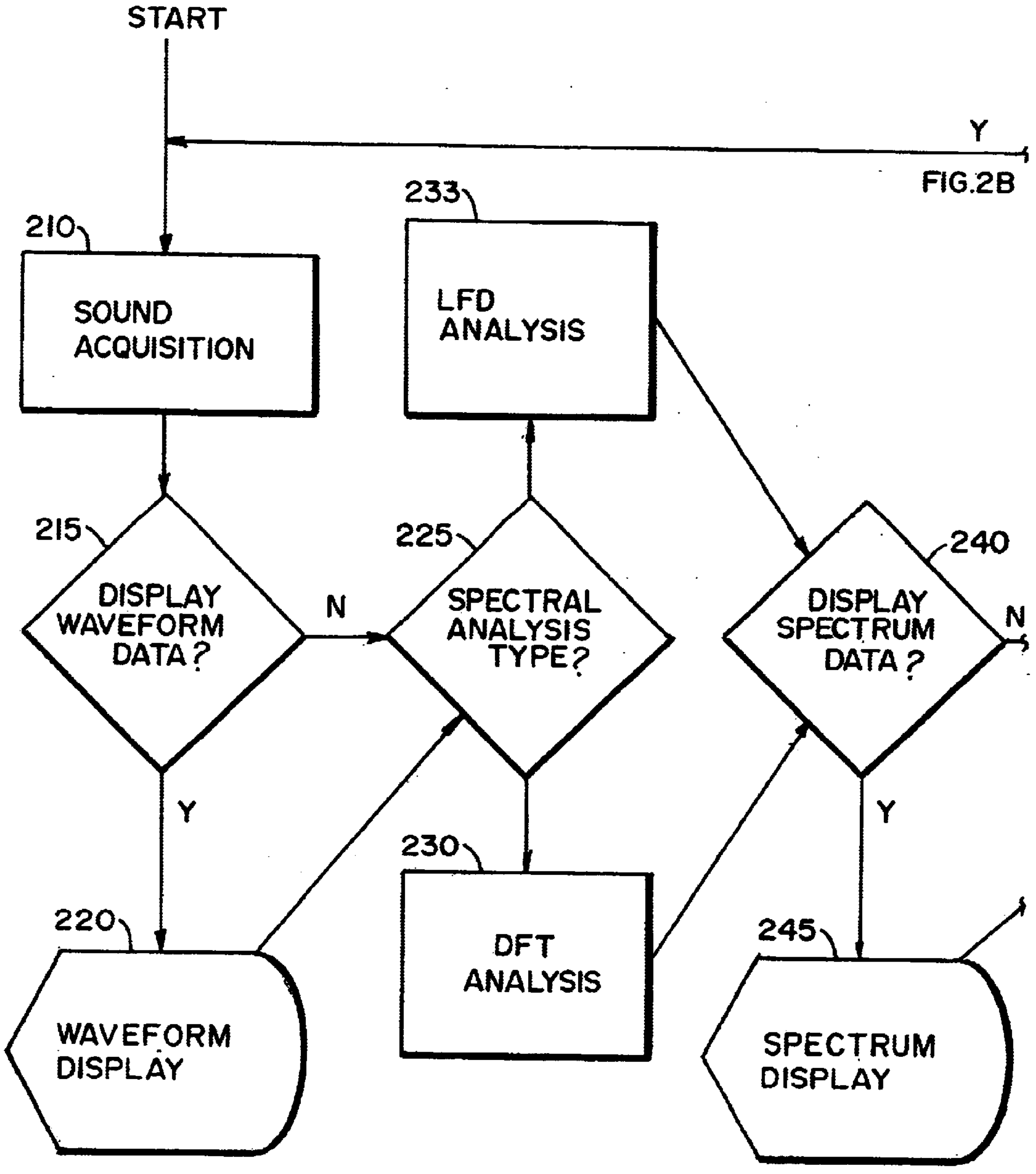
FIGS. 2A and 2B combined, depict a flow chart of an overall process, including a discrete-Fourier-transform (DFT) process, an alternative logarithmic-frequency-decomposition (LFD) process, a note-analysis process, and various display processes, all executed by the present system.
Figure 2B:
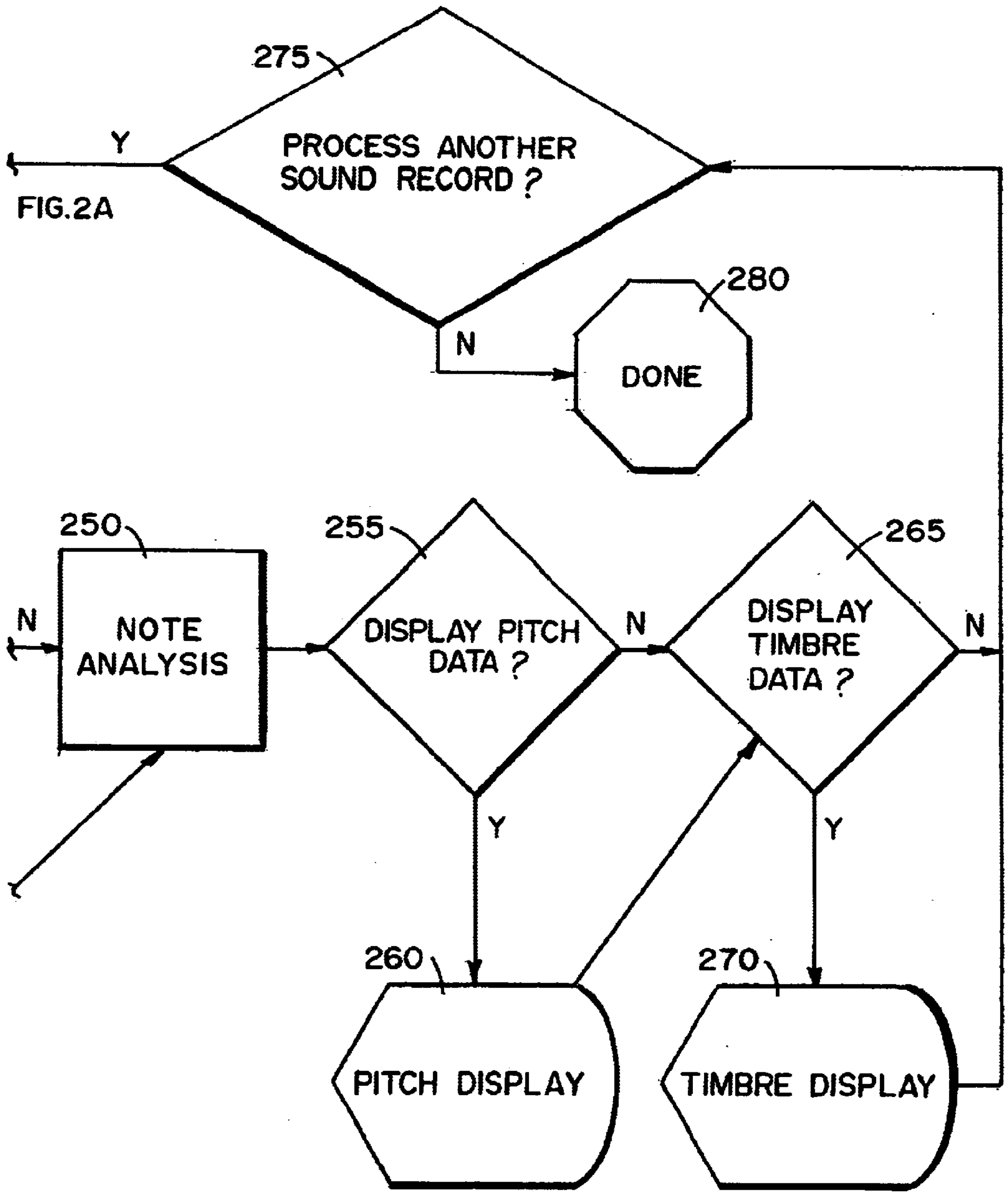
Figure 3:
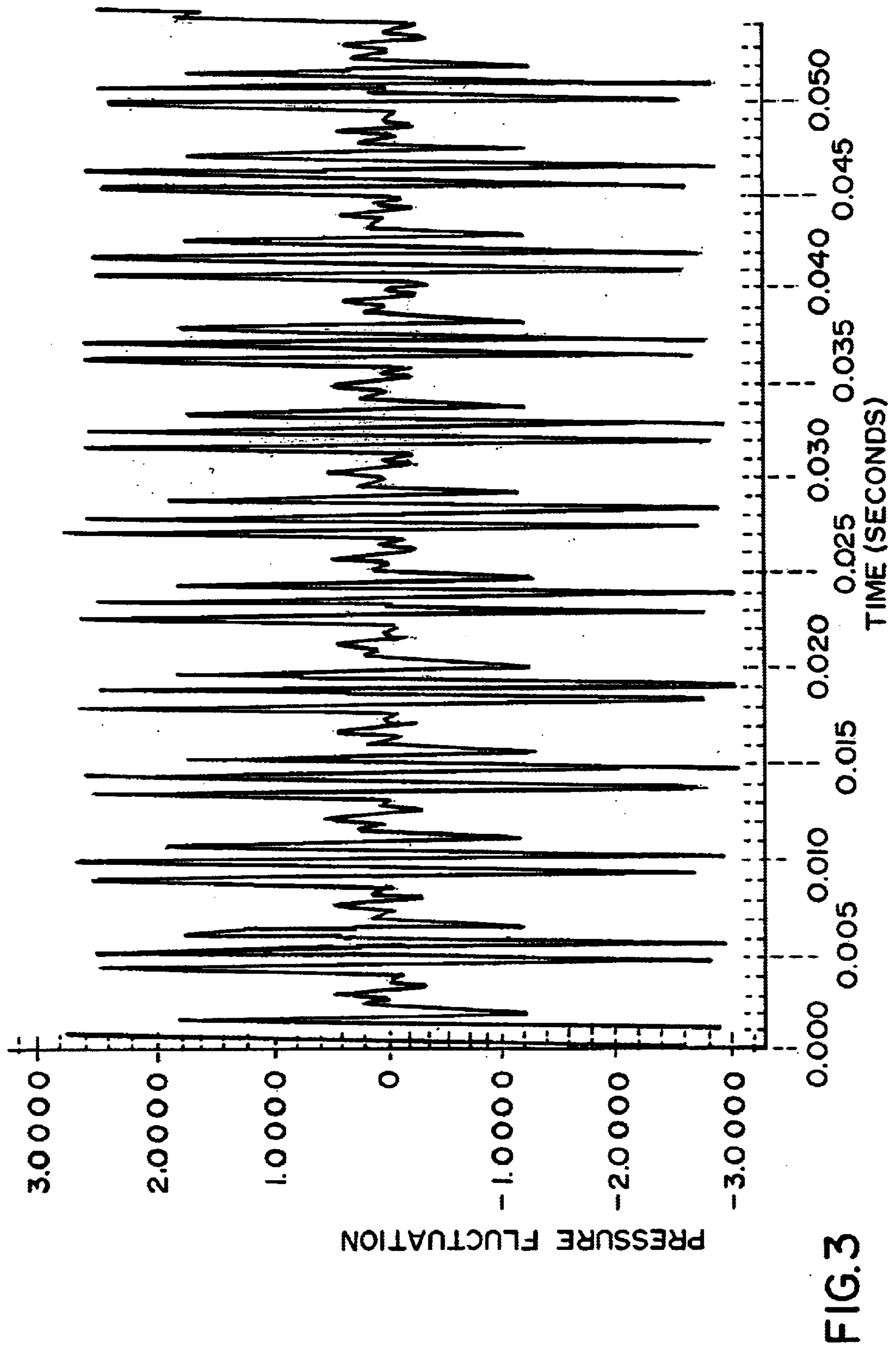
FIG. 3 is an example of the output produced by a waveform-display process.

FIG. 2 is a flow chart of the overall software process 200, which is typically stored in the Random-Access Memory 145. The process consists of a number of sub-processes 210 through 270, including sound acquisition 210, analytical processes 230, 235, and 250 that interpret the sound, and display processes 220, 245, 260, and 270 that visualize the results. Following acquisition, analysis and display, the entire process may be repeated, depending on the user-selectable parameter represented by decision box 275. Thus the sound emanating from the sound source 105 may be monitored repeatedly and periodically, the period T being the time necessary to traverse the loop represented by sub-processes 210 through 270. In a typical application, the entire process will be repeated many times, and T will be a fraction of a second.

The loop begins with Sound Acquisition 210: on the request of a user, the CPU 140 triggers the A/D Converter 130 to begin the acquisition of N samples of the voltage 115, where N is a positive integer and the voltage 115 represents the sound produced by source 105. The values of the integer parameters N, S, and B are selected by commands sent from the software process to the Waveform Input Device via the CPU prior to or simultaneous with the command that triggers the sample acquisition. Software to achieve the sample acquisition is well known in the art. For example, if the computer 120 is an IBM-Compatible Personal Computer (PC), then the software used to achieve sample acquisition typically employs calls to functions in Microsoft's Win32 API. In particular, the API functions waveInOpen( ), waveInPrepareHeader( ), waveInAddBuffer( ), waveInStart( ), and waveInStop( ) may be used.

When sound acquisition is complete (a process requiring N/S seconds), the raw waveform data (i.e. the integer values logged by the A/D Converter 130 vs. time) may be plotted on the display 160 using the Waveform Display process 220. An example of such a display is shown as FIG. 3; the sound this waveform represents is the note A220 played on the "Oboe" stop of a commercial, electronic keyboard. In FIG. 2, the Waveform Display process 220 is optional, depending on the user-selectable parameter represented by decision box 215. Means for performing such a display process are well known in the art. For example, if the computer is an IBM-Compatible Personal Computer, various functions in a plotting package such as ProEssentials from GigaSoft Inc. or Chart FX from Software FX Inc. may be used.

Following waveform acquisition, one of two types of spectral-analysis processes is performed on the raw waveform data: either Discrete Fourier-Transform (DFT) analysis 230, or a novel Logarithmic-Frequency Decomposition (LFD) analysis 235. Either type of spectral analysis produces an array of spectral amplitudes Φ(f) that describe the frequency content of the raw data at various frequencies f. The choice of spectral-analysis method depends on the user-selectable parameter represented by the decision box 225. DFT analysis is well known in the art of signal processing. See *Numerical Recipes in C; The Art of Scientific Computing*, incorporated above. LFD analysis 235 is an alternative to standard DFT analysis that avoids the DFT's shortcomings described earlier.

When spectral analysis is complete, the spectral data (i.e. the spectral amplitudes Φvs. frequency f) may optionally be plotted on the display 160 using the Spectrum Display process 245. An example of such a display is shown as FIG. 4. This spectrum is the LFD output corresponding to the raw waveform shown in FIG. 3 (i.e. the note A220 played on the "Oboe" stop of a commercial, electronic keyboard).

In FIG. 2, this Spectrum Display process 245 is optional, depending on the user-selectable parameter represented by decision box 240. Means for performing this display process are well known in the art, as discussed above in connection with the Waveform Display process 220.

Following spectral analysis, in a preferred embodiment, a novel Note Analysis 250 is performed to extract from the spectrum the pitch and timbre of the musical note contained in the sound. This analysis assumes that the sound contains at most one musical note. If the sound contains more than one, only the most prominent one is extracted. Essentially, note analysis extracts from the sound's spectrum a group of spectral peaks whose peak frequencies are all low integral multiples (to within a tolerance) of a common, fundamental frequency. These frequencies and amplitudes of the spectral peaks are then used to compute the note's pitch and timbre. For example, suppose a spectrum contains spectral peaks at 101, 199, 301, 330, 380, 501, 650, and 702 Hz, and the peaks at 301 and 501 are the largest and second largest in amplitude, respectively. The note-analysis process will determine that the peaks at 101, 199, 301, 501 and 702 Hz are related by being low-integral multiples of a common fundamental at approximately 100 Hz (to within a tolerance). The note analysis therefore identifies these five peaks as belonging to the principle note in the sound, and recognizes them as representing overtones 1, 2, 3, 5, and 7 ("overtone 1" being synonymous with "the fundamental"). The other two peaks, 330 and 380, are rejected as extraneous; perhaps they are attributable to background noise.

The final part of note analysis is to determine the pitch and timbre of the extracted note. In one preferred embodiment on the invention, the pitch of the note is defined to be an amplitude-weighted average of the estimates that the various overtones make of the fundamental frequency. For the example postulated above, these "estimates of the fundamental frequency" are 101/1, 199/2, 301/3, 501/5, and 702/7, respectively, for overtones 1, 2, 3, 5, and 7. If the amplitudes (in some arbitrary units) of these five note peaks are 10.0, 8.0, 6.0, 4.0, and 2.0 respectively, then the pitch of the note is computed to be $$p=\frac{10.0(101/1)+8.0(199/2)+6.0(301/3)+4.0(501/5)+2.0(702/7)}{10.0+8.0+6.0+4.0+2.0}=100.31\text{ Hz.}\tag{12}$$

A useful measure of "timbre" is obtained by defining it to be the vector Q whose $i^{th}$ element $Q_i$ is the amplitude of the note's $i^{th}$ overtone, all amplitudes being normalized by the largest one. Thus, for the above example, the timbre of the note is described by the vector(1.0, 0.8, 0.6, 0, 0.4, 0, 0.2, 0, 0, 0, 0, 0, . . . ), where the non-zero elements are the amplitudes of overtones 1, 2, 3, 5, 7 (normalized by the largest amplitude 10.0), and the zero elements represent the missing overtones in the note. For practical purposes, the length of the vector Q is truncated to some finite value such as 24.

Figure 5:
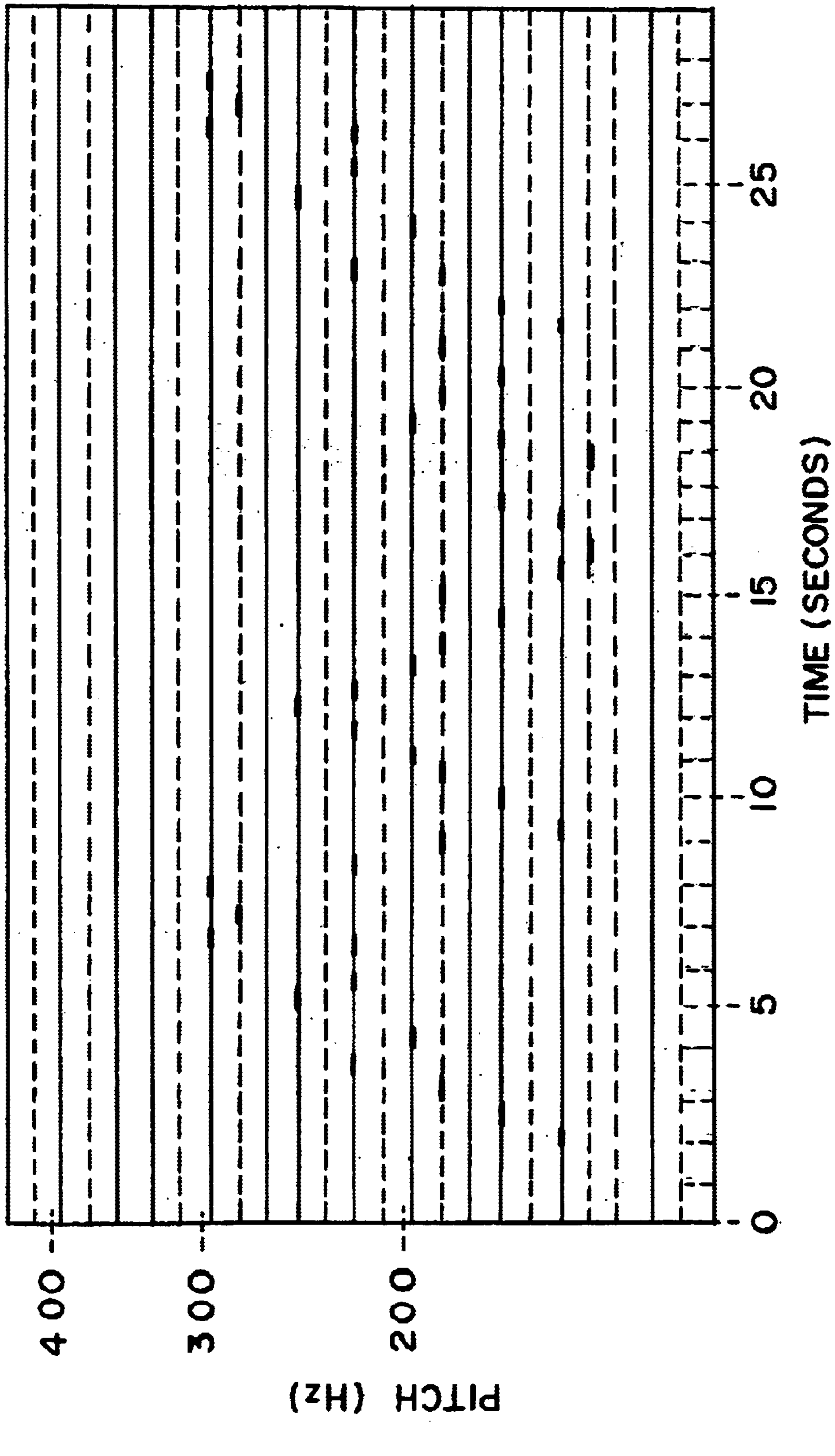
FIG. 5 is an example of the output produced by a pitch-display process.
Figure 6:
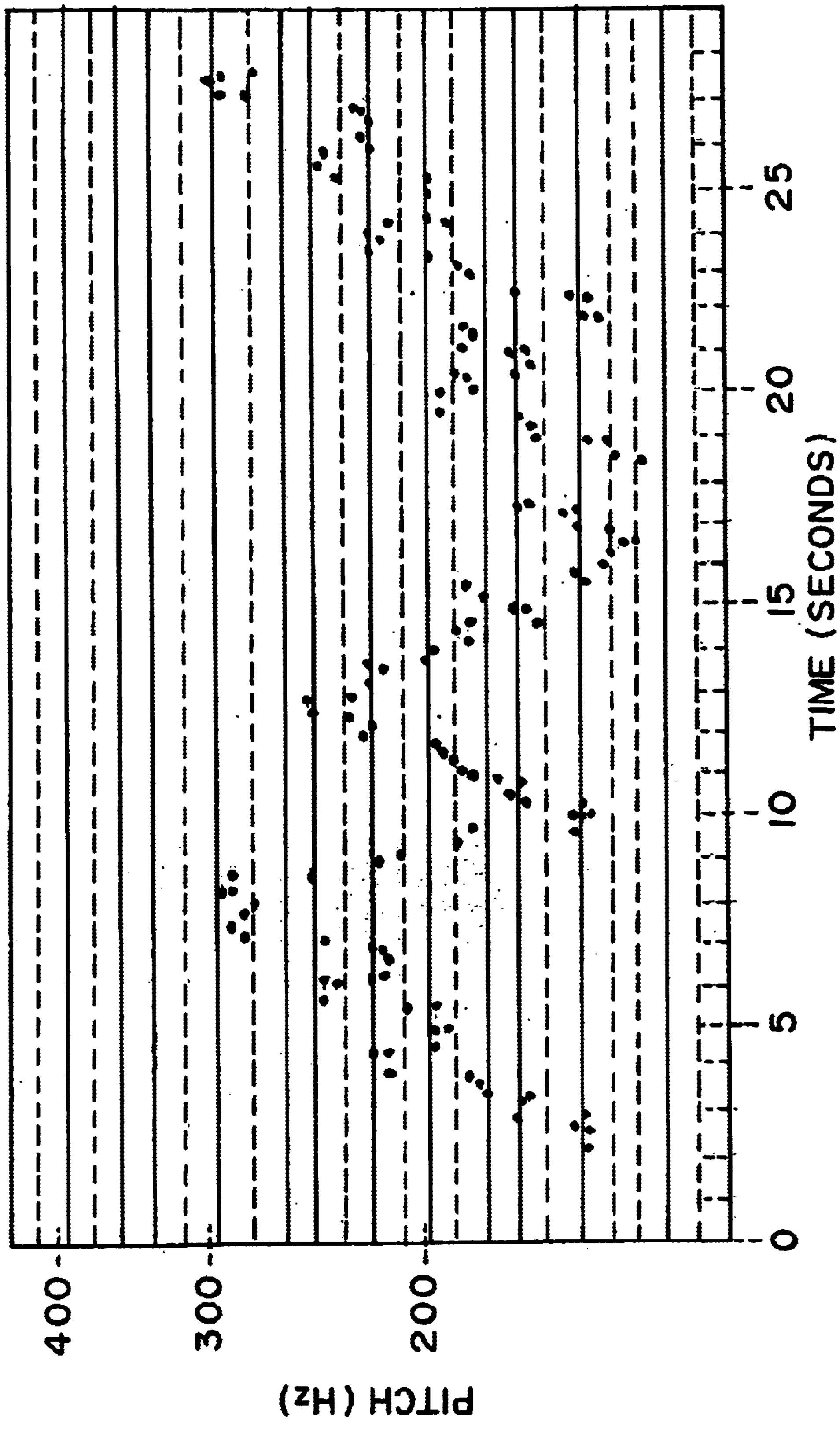
FIG. 6 is another example of the output produced by the pitch-display process.

When note analysis 250 is complete, the computed pitch p may be plotted (vs. the time t that the sound record was acquired) on the display 160 using the Pitch Display process 260. This display process is optional, depending on the user-selectable parameter represented by decision box 255. In reality of course, as described above, the "sound record" comprises N raw samples of the pressure waveform acquired over a time interval N/S, so t is taken to be the center of that interval. Thus, the Pitch Display process 260 involves, for each traversal of the loop 210–275, the plotting of just one point, (p, t), on a graph of pitch (Hz) versus time. In one preferred embodiment of the invention, as sounds are acquired in sequence during multiple traversals of the loop 210–275, the Pitch Display process may be arranged to show the accumulated series of pitches (P1, P2, P3, . . . ) versus times ($t_1$,$t_2$,$t_3$, . . . ). That is, the various points ($p_i$,$t_i$) may be plotted simultaneously on a single graph, with new points being added in real time, thereby providing a "live" measure of the pitch that also includes recent history, in the manner of a strip-chart recording. An example of such a display is shown in FIG. 5. This result was obtained on a system for which the loop period T (and therefore the horizontal distance between data points) is about 186 ms when 600 pressure samples comprise each loop's sound record. This figure shows the pitch record for the oboe stop of a commercial electronic keyboard playing the theme from J. S. Bach's "Jesu, Joy of Man's Desiring". The vertical space on the plot is annotated by lines that document the frequencies of musical "notes"; solid lines represent the keyboard's "white notes", and dotted lines represent "black notes". The letter names of the white notes are also given on the right axis. All of the data points in FIG. 5 are exactly on the "note lines", because the electronic keyboard produces precisely correct pitches. For non-electronic instruments, however, this is rarely the case. FIG. 6, for example, shows the same melody as FIG. 5 performed by a singer instead of a keyboard instrument. The singer's pitch is decidedly less accurate, and the pitch plot quantifies this instant by instant. Such a plot is extremely useful for musicians seeking to monitor pitch in real time.

Figure 7:
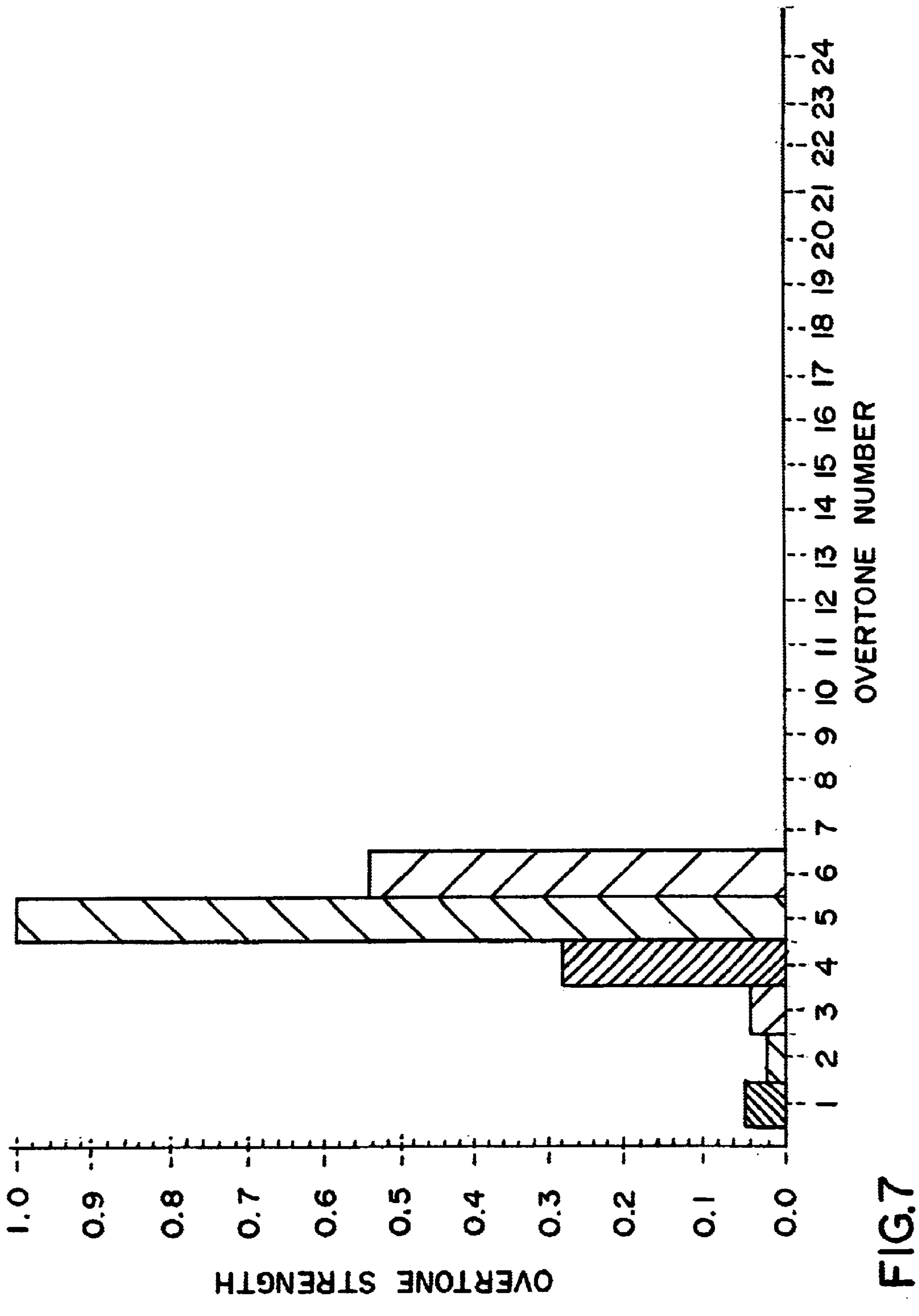
FIG. 7 is an example of the output produced by a timbre-display process.

Likewise, when note analysis is complete, the timbre Q of the extracted note may be displayed. This display process is optional, depending on the user-selectable parameter represented by decision box 240. In one preferred embodiment of the invention, the elements of the vector Q are displayed in the form of a bar chart. For example, FIG. 7 shows the timbre associated with the spectrum shown in FIG. 4. Thus, the shape of the bar chart illustrates the overtone content (i.e. timbre) of the sound. As sounds are acquired in sequence, the bar chart is updated in real time to reflect the timbre of the most recent sound. Such a plot is extremely useful for musicians seeking to monitor tone quality in real time.

Two of the analytical sub-processes discussed above, LFD Analysis 235 and Note Analysis 250, form the heart of the invention, and each requires elaboration.

Logarithmic-Frequency-Decomposition (LFD) Analysis

To remedy the problem discussed earlier under "Problems With the Prior Art", the set of evaluation frequencies $f_k$ normally used with Fourier analysis, given by eq. (5) above, must be modified, since this choice of frequencies creates the problem expressed by eq. (7). The choice of frequencies $f_k$ in eq. (5) is normally made for two reasons, but it is important to realize that neither applies to the current invention:

1. The $f_k$ in eq. (5) produce a set of N numbers $\hat{G}(f_k)$ in eq. (4) that can be "inverse transformed" to recover exactly the original N data points $\hat{g}(t_n)$. Although this is essential in many areas of technology, it is irrelevant for the current invention because, as in the human ear, once conversion to the frequency domain is accomplished, there is no need to retrieve the original pressure signal g(t,). In other words, an invertible "transform" is not needed for this invention.
2. The $f_k$ in eq. (5) permit the Discrete Fourier Transform to be efficiently computed using the Fast Fourier Transform (FFT) algorithm, since the latter requires uniform spacing of the evaluation frequencies $f_k$. For the current invention, however, it is important to execute quickly the entire process loop in FIG. 2, which includes data acquisition as well as computation, so computational efficiency alone is not enough. From this holistic viewpoint, the advantage offered by the FFT's computational efficiency is more than outweighed by the disadvantage of eq. (5), which, as explained above, implies that to use the FFT with good (fine) frequency granularity, data acquisition must be very slow.

Thus, for purposes of this invention, there is no reason to use the set of evaluation frequencies $f_k$ in eq. (5). In fact, the Fourier-style sums $\hat{G}$ may be computed at whatever set of evaluation frequencies makes sense—the $f_k$ may be distributed as desired, uniformly or not, and there may be any number of them, not necessarily N. For each chosen value of $f_k$, the square of the complex magnitude of $\hat{G}$ will still tell the spectral power density $\Phi$ of g(t) at that frequency, namely $$\Phi(f_k)=|\hat{G}(f_k)|^2. \tag{13}$$

Therefore, in accordance with the present invention, Logarithmic Frequency Decomposition (LFD) analysis 235 is provided as a superior alternative to conventional Discrete Fourier Transform (DFT) analysis 230. LFD chooses the following set of evaluation frequencies $f_k$ instead of eq. (5):

$$f_k=f_0 2^{k/M},\ k=0, \ldots, K-1. \tag{14}$$

In this equation, $f_0$ is a fixed frequency to be specified, M is the number of evaluation frequencies per octave, and K is an integer to be specified. The idea behind the logarithmic nature of eq. (14) is to distribute the evaluation frequencies uniformly in a musical sense. As is well known in the art of music theory (see R. H. Cannon, Jr., *Dynamics of physical Systems*, McGraw Hill, 1967, ISBN07-009754-2, herein incorporated by reference), Western music uses a system of equal temperment having 12 "notes" per octave, and the notes have frequencies $$(f_{note})_j=f_{ref}2^{j/12},\ j=0,\pm1,\pm2 \tag{15}$$

where $f_{ref}$ is a pitch reference such as 440 Hz. The interval between two adjacent notes is called a half step. Thus, eq. (14) chooses Fourier evaluation frequencies $f_k$ that are uniformly spaced with respect to this musical system. Other equally tempered musical systems (with different numbers of notes per octave) are also accommodated by eq. (14), because the octave (frequency ratio 2:1) is common to all systems. To be specific, however, the following focuses on the 12-tone system given by eq. (15).

It is useful to choose the free parameters $f_0$ and M in eq. (14) so that one of the evaluation frequencies $f_k$ aligns with each of the musical notes $f_{note}$. For this purpose, let $f_0$ be equal to the lowest $f_{note}$ required for a particular application. For example, if sounds from a piano are to be analyzed, choose $f_0$=27.5 Hz (lowest A on the piano); if sounds from a violin are to be analyzed, choose $f_0$=196.0 Hz (G below middle C). Since M is the number of evaluation frequencies per octave, it should be chosen as a multiple of 12 to accommodate the 12 half steps per octave, $$M=12\text{ m}. \tag{16}$$

Thus m is the number of evaluation frequencies per half step: if m=1, the frequency granularity is a half step; if m=2, the granularity is one half of a half step; if m=5, the granularity is one fifth of a half step, and so on.

To summarize, LFD analysis 235 has three advantages over traditional DFT analysis 230, for purposes of this invention:

1. The LFD's frequency-evaluation points given by eq. (14) are based on uniform frequency ratios, and are therefore distributed evenly in the musical sense. In contrast, the DFT's evaluation points given by eq. (5) are based on uniform frequency differences, and are therefore distributed unevenly in the musical sense, such that the frequency granularity is too coarse at low frequency.
2. The LFD's frequency-evaluation points may be located exactly on every musical note, as explained above; it is impossible to achieve this with the DFT.
3. As shown in Table 1, the LFD admits five parameters S, N, K, $f_0$, and m, which may all be selected independently of each other. This leads to flexibility in practice; for example, the minimum frequency may be selected independently of the frequency granularity. Most importantly, the LDF's frequency granularity $\Delta f$ is independent of the sound acquisition time $\Delta t_{meas}$, since they depend on different independent parameters. In contrast, the DFT admits only two parameters, S and N. This leads to inflexibility; for example, the minimum frequency must be the same as the frequency granularity. Most importantly, having only two parameters leads to the essential dilemma given by eq. (7), $\Delta f \Delta t_{meas}=1$, a dilemma that the LFD was designed to solve.

TABLE 1

DFT vs. LFD Parameters

| | DFT | LFD |
|---|---|---|
| Sampling Rate (Hz) | S | S |
| Number of Time Points | N | N |
| Number of Frequency Points | N | K |
| Minimum Frequency (Hz) | S/N | $f_0$ |
| Sound Acquisition Time $\Delta t_{meas}$ (sec) | N/S | N/S |
| Frequency Granularity $\Delta f$ (Hz) | S/N | $\frac{1}{m}f\left(\sqrt[12]{2}-1\right)$ |
| Normalized Frequency Granularity, $\frac{\Delta f}{\Delta f_{half\ step}}$ | $\frac{S/N}{f\left(\sqrt[12]{2}-1\right)}$ | $\frac{1}{m}$ |

To obtain the above advantages of the LFD, there is a countervailing disadvantage with regard to computational efficiency. The DFT is typically implemented using the Fast Fourier Transform (FFT) algorithm, whose speed on processors such as a 200 MHz Intel Pentium is so remarkable that the computation time is insignificant compared to the sound acquisition time $\Delta t_{meas}$. Unfortunately, the LFD cannot be implemented by an FFT-like algorithm, because the frequency spacing is logarithmic rather than linear. Nevertheless, reasonable computational efficiency may be obtained as follows.

The problem is to compute efficiently the Fourier sums $$\hat{G}(f_k)=\frac{1}{S}\sum_{n=0}^{N-1}\hat{g}(t_n)e^{2\pi i f_k t_n}, \tag{17}$$

for the LFD's array of evaluation frequencies $$f_k=f_0 2^{k/M},\ k=0, \ldots, K-1. \tag{18}$$

Begin by defining the array of coefficients $$\alpha_{k,n}=\exp(2\pi i f_0 2^{k/M} t_n),\ k=0, \ldots, K-1;\ n=0, \ldots, N-1. \tag{19}$$

such that $$\hat{G}(f_k)=\frac{1}{S}\sum_{n=0}^{N-1}\alpha_{k,n}\hat{g}(t_n), \tag{20}$$

The key observation, which is clear from eq. (19), is $$\alpha_{k+M,n}=\alpha^2_{k,n}; \tag{21}$$

This is true because, by adding M to k, a factor of 2 is introduced into the exponential. Physically, eq. (21) says that the coefficient $\alpha_{k+M,n}$ corresponding to an evaluation frequency in a given octave is equal to the square of the corresponding coefficient $\alpha_{k,n}$ one octave below. This implies that only the lowest octave's worth of the coefficients need to be computed using trigonometric functions; higher octaves may be computed by recursion. Assuming that $C_{k,n}$ and $S_{k,n}$ are the real and imaginary parts of $\alpha_{k,n}$ respectively, i.e.

$$\alpha_{k,n}=C_{k,n}+iS_{k,n}, \tag{22}$$

then the recursion is as follows:

$$\alpha_{k+M,n}=(C^2_{k,n}S_{k,n})+i(2C_{k,n}S_{k,n}) \tag{23}$$

Thus, each complex number $\alpha_{k,n}$ corresponding to an evaluation frequency in an octave other than the lowest is computed as the square of the corresponding complex number one octave below, thereby avoiding the computationally costly evaluation of trigonometric functions.

A second observation is that the $\alpha_{k,n}$ depend on constant parameters only, not on the data $g(t_n)$. Therefore the lowest octave's $\alpha_{k,f}$, which must be computed to seed the recursion, may in fact be computed only once and stored, implying that no trigonometric functions need to be computed during real-time data acquisition and visualization. The amount of storage required for the lowest octave's $\alpha_{k,n}$ is modest by today's standards: if the number of samples in a sound record is N=1000 and the number of frequency-evaluation points per octave is M=60 (i.e. m=5 divisions per half step), then the storage for one octave of $C_{k,n}$ and $S_{k,n}$ is about 469 kilobytes.

A third observation, assuming that the recursion scheme (23) is used, is that efficient computation of the sums in eq. (20) requires care in the arrangement of loops, to avoid handling the stored numbers $C_{k,n}$ and $S_{k,n}$ more than once. The pseudo-code below shows the proper arrangement of loops. (As given, the pseudo-code assumes that the frequency range covers is an integral number of octaves. If instead the highest octave is incomplete, the pseudo-code must be modified slightly).

```
for ( k=0; k < M; k++ ) // Loop on octave-division index
{
    for ( j=0; j<J; j++ ) // Clear sums
    {
        RealSum[j] = 0;
        ImagSum[j] = 0;
    }
    for (n=0; n<N; n++) // Loop on time index.
    {
        // Recall stored cos and sin for octave 0.
        C = Real (a[k,n]);
        S = Imag(a[k,n]);
        // Add to sums for octave 0.
        RealSum[0] += C * gData[n];
        ImagSum[0] += S * gData[n];
        //
        for ( j=1; j<J; j++ ) // Loop on octaves.
        {
            Cold = C;
            C = C*C - S*S    // Apply recursion formula.
            S = 2*Cold*S
            RealSum[j] += C* gData[n]; // Add to sums for octave j.
            ImagSum[j] += S* gData[n];
        } End for j
    } // End for n
    // Compute power spectral density.
    for ( j=0; j<J; j++ )
    {
```

-continued

```
        phi (j*M + k) = RealSum[j]**2 + ImagSum[j]**2
    }
} // End for k
```

The essential idea in the above pseudo-code is to recall each of the stored complex number a[k,n] (the lowest-octave coefficients that seed the recursion) only once, thereby avoiding memory and cache inefficiencies. Accordingly, the outermost loop on k processes each set of "octave-equivalent" frequency points together, since each such set depends on just one row of the matrix a[k,n]. Likewise, for each octave-equivalent set of frequency points, the middle loop on n processes all terms in the Fourier sums that depend on the same element a[k,n] of the matrix. Finally, the innermost loop on j applies the octave-squaring recursion formula (23). When the loop over the time index n is finished, the Fourier sums for the set k of octave-equivalent frequency points are complete, so the power spectral densities for this set of points may be calculated.

For example, suppose that the frequency evaluation covers exactly J=4 octaves, starting at middle C(262 Hz), with M=12 frequency-evaluation points per octave—one point located exactly on each true musical note. This implies that there are 48 frequency evaluation points in all. On the first iteration of the outermost loop, with k=0, the above code accesses the real and imaginary parts of each of the numbers a[0,n] only once to compute the power spectral densities for the octave-equivalent frequency evaluation points 0, 11, 23, and 35. These frequencies correspond the four C's (middle C plus 3 higher octaves). Within the k=0 loop, the first iteration of the loop on n handles all terms in the Fourier sums that depend on a[0,0]; the second iteration of the loop on n handles all terms that depend on a[0,1], and so on. On the second iteration of the outermost loop, with k=1, the above code computes the power-spectral densities for frequency evaluation points 1, 12, 24, and 36, which correspond to the four C#'s, and each of the numbers a[ 1,n] is accessed once in the loop on n. Subsequent iterations of the k loop proceed similarly. In this fashion, each complex number a[k,n] is retrieved from memory only once, in memory-contiguous order, to ensure the most efficient use of cache.

To compare this invention's LFD process to the prior art's DFT/FFT process, it is useful to consider the tradeoff between two figures of merit:

1. Frequency granularity normalized in units of musical halfsteps, $$\Delta h \equiv \frac{\Delta f}{\Delta f_{halfstep}}, \tag{24}$$

where $\Delta f_{halfstep}$ is given by eq. (10), and

2. Processing time $$\Delta t_{process} \equiv \Delta t_{meas} + \Delta t_{spec}, \tag{25}$$

where $\Delta t_{spec}$ is the time required to perform spectral analysis, and $\Delta t_{meas}$ is given by eq. (3). (Other sub-processes in FIG. 2 are common to the two spectral-analysis methods, so are not included in $\Delta t_{process}$).

As discussed in the paragraph surrounding eqs. (8) through (11), it is desirable that both of these figures of merit be as small as possible.

Because the FFT is so efficient, $\Delta t_{spec}$ for the DFT/FFT is very small compared to $\Delta t_{meas}$ and may be neglected, hence $$\Delta t_{process} \approx \Delta t_{meas} \cdot (\text{DFT/FFT only}) \tag{26}$$

Recalling eq. (7), substituting eq. (25) and dividing by eq. (10) produces the following equation expressing the DFT/FFT's tradeoff between the two figures of merit:

$$\Delta h \approx \frac{1}{f \Delta t_{process} \left(\sqrt[12]{2} - 1\right)}. \ (DFT/FFT \text{ only}) \tag{27}$$

Thus, for the DFT/FFT, the two figures of merit tradeoff against each other in the form of rectangular hyperbolas, with frequency f as parameter. Four of these hyperbolas, Δh vs. $\Delta t_{process}$ for f=110, 220, 440, and 880 Hz, are plotted as the solid curves in FIG. 8. Each curve is annotated with the value of f and the corresponding musical note name "A". The small dots on the curves in FIG. 8 represent locations that are typically possible in practice, inasmuch as $\Delta t_{meas}$= N/S, N is an integral power of 2 (FFT requirement), and waveform-input devices typically provide S=8000, 11025, 22050, or 44100 samples/sec.

Figure 8:
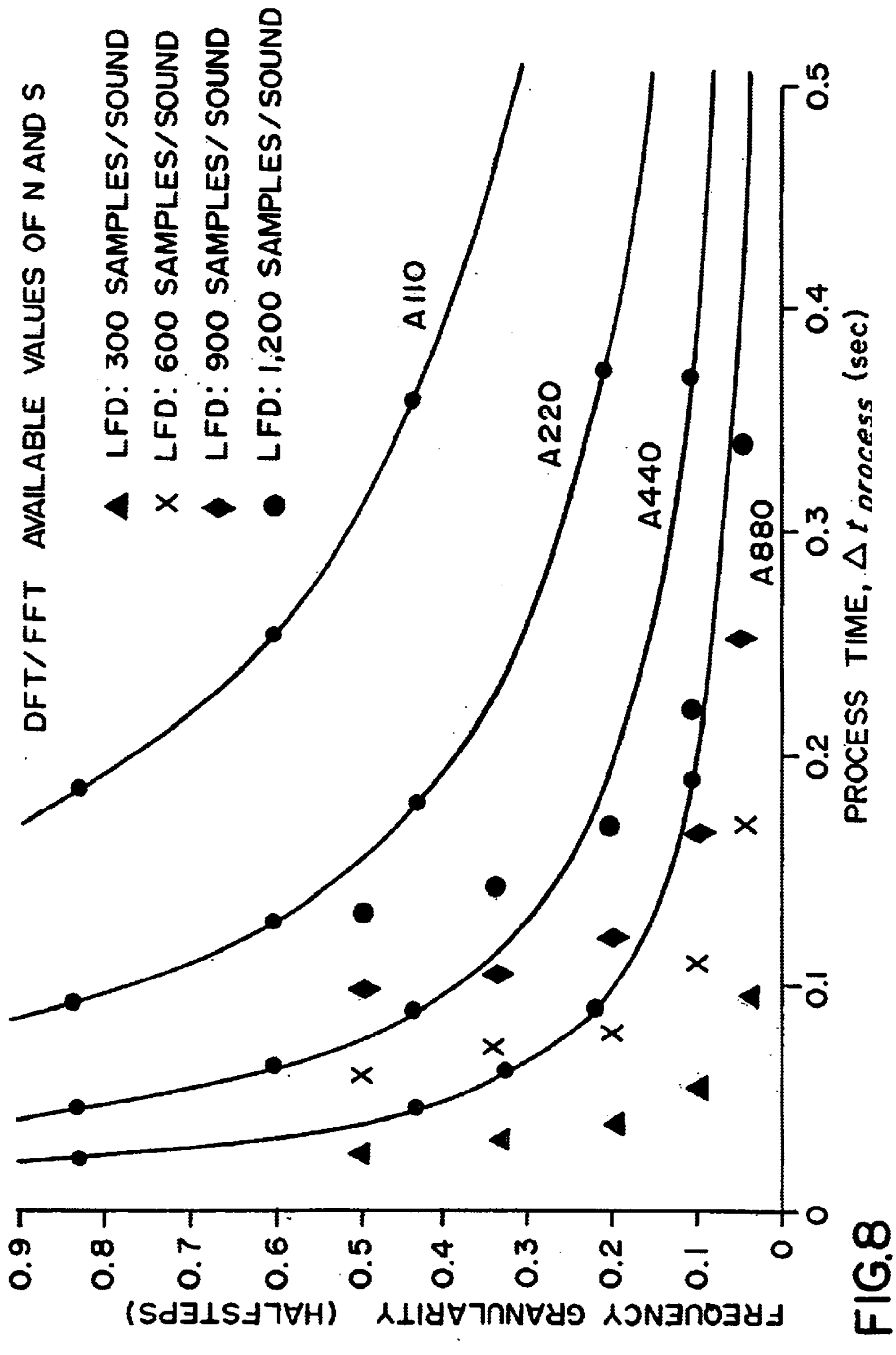
FIG. 8 is a graph comparing the DFT process to the LFD process with regard to two figures of merit, frequency granularity and process time.

In FIG. 8, it is desirable to be close to the origin. In fact, as explained earlier in connection with eqs. (8) through (11), values on the order of 0.1 or less for both Δh and $\Delta t_{process}$ are desirable for the musical application addressed by this invention. But the hyperbolas are the best that the DFT/FFT can do to approach the origin. Clearly, this is not good enough for purposes of this invention, particularly at low frequencies such as A110.

For the LFD, it is impossible to draw generic curves analogous to the DFT's hyperbolas, because $\Delta t_{meas}$ and $\Delta t_{spec}$ are both significant for the LFD, and $\Delta t_{spec}$ must be measured experimentally inasmuch as it is dependent on the type of computer 120 and especially upon the type of CPU 135. Thus, the LFD data on FIG. 8 is shown as four sets of discrete data points. For each point, the abscissa is the sum given by eq. (25), where $\Delta t_{spec}$ was measured on an IBM Intellisation computer containing a 200 MHz Pentium Pro processor.

The results show clearly that the LFD vastly outperforms the DFT/FFT in its ability to approach the origin of FIG. 8; that is, to achieve simultaneously fast processing time and fine frequency granularity. In spite of less-efficient spectral computation, the LFD wins because it is not hampered by eq. (7) (the unnormalized form of eq. (27)). This is particularly true at low frequency, such as A110, which is in the middle of the human male's bass voice range. However, it is even true at higher frequency, such as A880, which is at the top of the human female's soprano voice range.

Notice that each LFD data set approaches a vertical asymptote as the frequency granularity becomes large. This asymptote is $\Delta t_{meas}$; that is, as the frequency granularity becomes large, $\Delta t_{spec}$ falls to zero because fewer frequency-evaluation points implies less computation, and so $\Delta t_{process}$ approaches $\Delta t_{meas}$=N/S. Thus, the amount that each LFD data set curls downward to the right is a reflection of spectral computation time $\Delta t_{spec}$. This may be improved in two ways:

1. Use a faster computer. $\Delta t_{spec}$ will decrease as CPU speed increases.
2. Separate data acquisition into a separate computational thread. This allows the spectral analysis of a previously acquired sound to be handled by the CPU 135 while data for the next sound is simultaneously being acquired by the waveform input device 125. This works because data acquisition does not burden the CPU; in fact, in the single-thread implementation, the CPU is essentially idle during $\Delta t_{meas}$.

In contrast, the curves given for the DFT/FFT on FIG. 8 are not subject to improvements in computer technology. Even if the CPU 135 is infinitely fast, the curves remain as shown, because equation (7) is intrinsic to the DFT algorithm.

Figure 9:
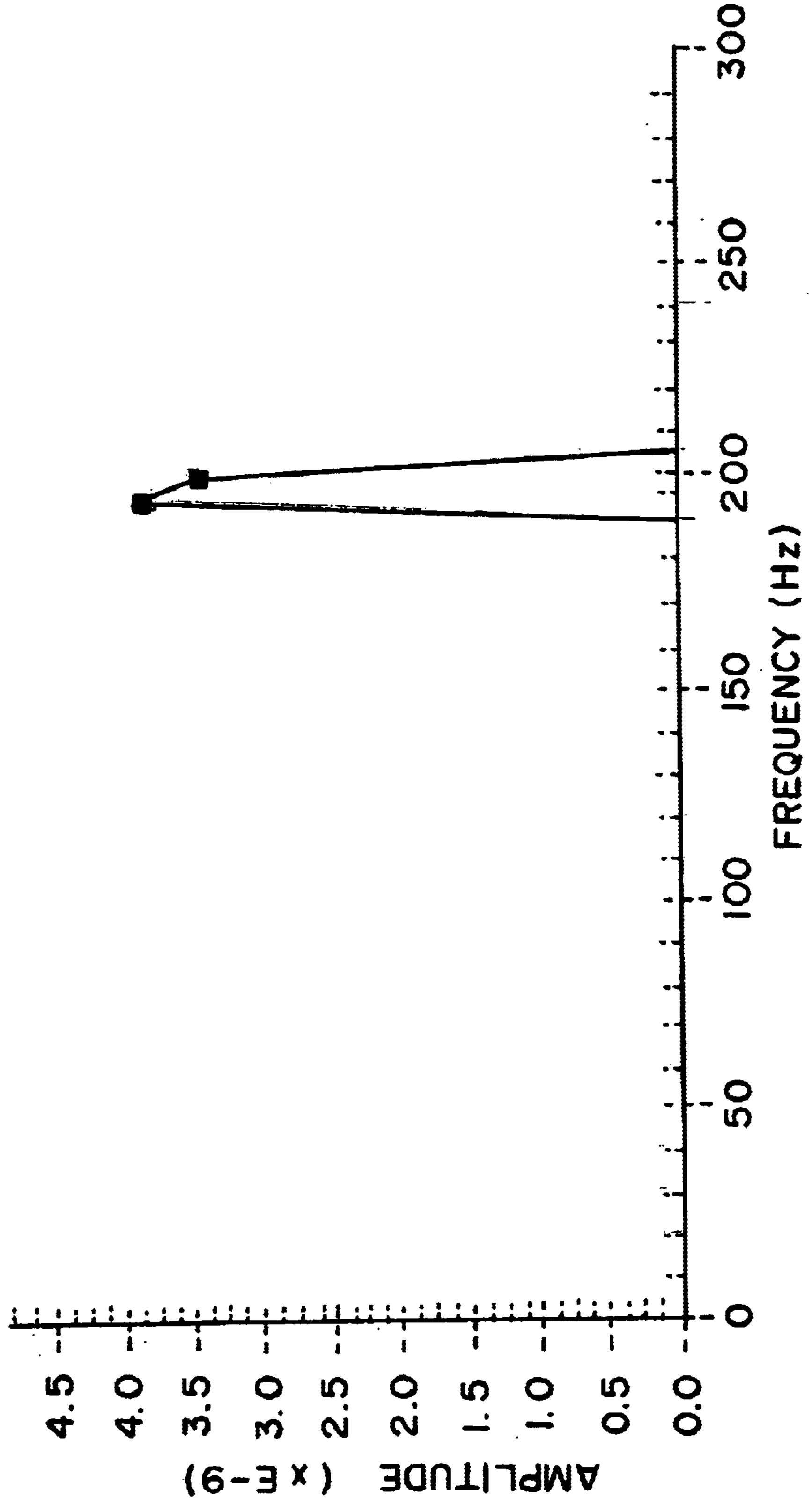
FIG. 9 is an example of the output produced by the DFT process, showing the DFT's typical, coarse frequency granularity.
Figure 10:
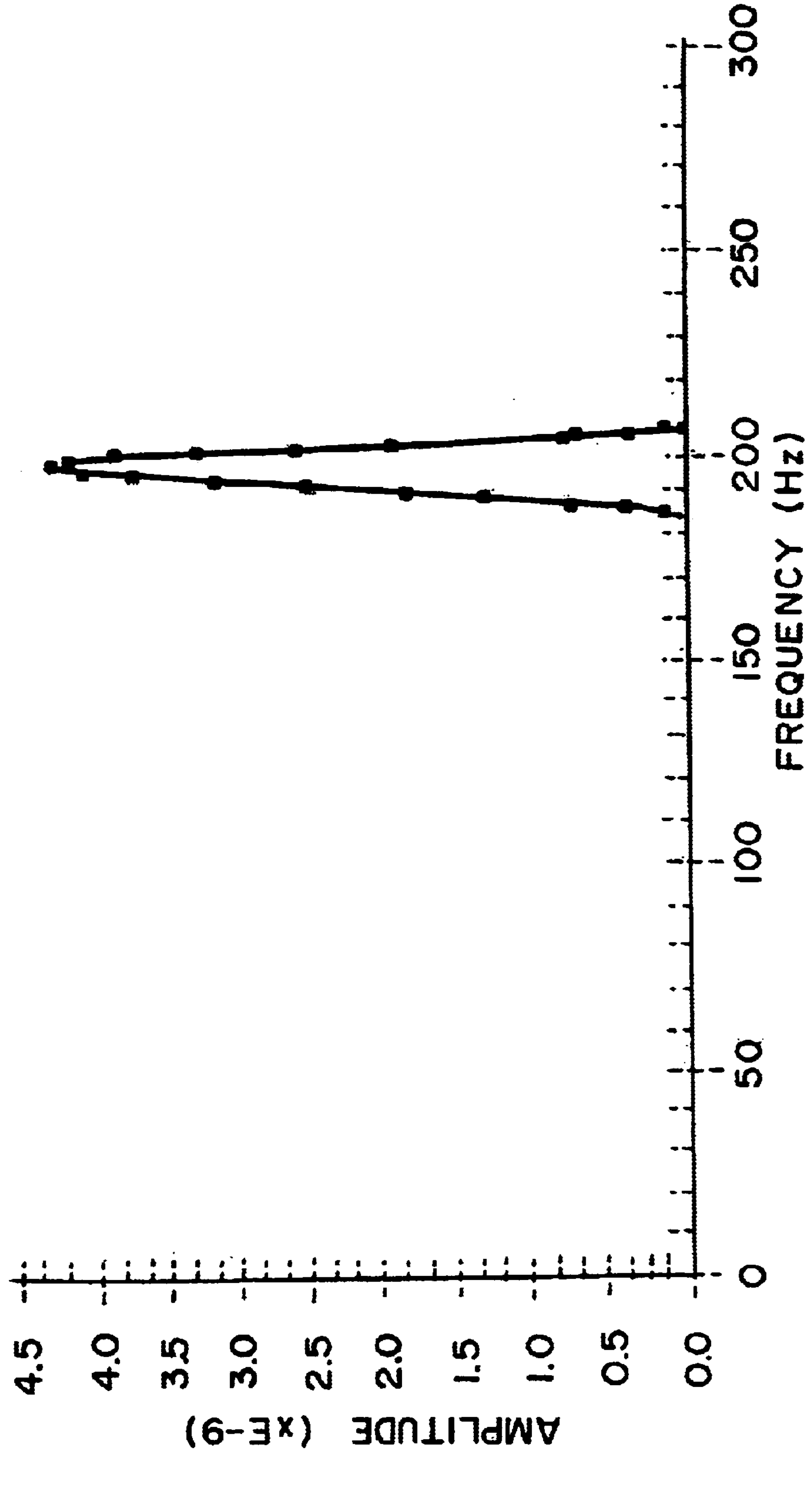
FIG. 10 is an example of the output produced by the LFD process, analogous to FIG. 9, showing the LFD's relatively finer frequency granularity.

The superiority of the LFD over the DFT/FFT may be further demonstrated by observing the spectra they produce. FIGS. 9 and 10 show a typical comparison, where each frequency-evaluation point in the spectrum is plotted as a data point, and the points are connected by a line for ease of viewing. For this comparison, the sampling rate is S=11025 samples/sec in both cases. The number of samples N (2048 for the DFT/FFT, 1200 for the LFD) and the LFD's frequency granularity (m=10 divisions per halfstep; c.f. eq. (16)) and other parameters ($f_0$=55 Hz, K=780) have been chosen to produce roughly the same $\Delta t_{process}$ (about 185 ms) in the two cases. The sound being analyzed in each case is G below middle C (196.0 Hz) played on the "flute" stop of a commercial keyboard. In both cases, the frequency scale has been expanded to show only the fundamental spectral peak at 196 Hz. The result is clear. On the one hand, in FIG. 9, the DFT/FFT's frequency granularity is very coarse, as shown by the spacing of data points near the horizontal axis. To be sure, this coarse granularity may be reduced by increasing N, but then $\Delta t_{meas}$=N/S, and hence $\Delta t_{process}$, will increase in accordance with eq. (27). The DFT/FFT's coarse frequency granularity in FIG. 9 leads to an artificially truncated spectral peak that fails to find the true peak frequency, because there is no frequency-evaluation point sufficiently near the true peak. On the other hand, in FIG. 10, the LFD's frequency granularity is very fine, allowing the true peak frequency to be accurately found.

In summary, for purposes of this invention, the LFD is a superior algorithm to the DFT/FFT for the three reasons given earlier in connection with Table 1. Notably, it allows the parameters related to spectral analysis (frequency granularity m and frequency-range parameters $f_0$ and K) to be specified independently of the parameters related to data acquisition (N and S). This superiority has been shown above both in general (FIG. 8) and by specific example (FIGS. 9 and 10).

Note Analysis

Note Analysis 250, explained briefly in the foregoing (near eq. (12)), is described in more detail in FIG. 11. The input to Note Analysis is the power spectrum $\Phi(f_k)$, a set of real numbers that is easily derived, via eq. (13), from the complex numbers $\hat{G}(f_k)$ produced by spectral analysis. If the spectral-analysis method is DFT/FFT, then k=0, . . . , N−1; if the spectral-analysis method is LFD, then k=0, . . . , K−1.

Note Analysis 250 assumes that the sound emanating from sound source 105 contains at most one "musical note", where a musical note is defined as a collection of one or more spectral peaks in the power spectrum $\Phi(f_k)$ whose peak frequencies are all integral multiples (to within a tolerance) of a common fundamental frequency. An example of such a power spectrum has been given previously as FIG. 4, where all of the peak frequencies, at approximately 220, 440, 660, 880, 1100, 1320, and 1540 Hz, are low integral multiples of the fundamental at 220 Hz. If the sound emanating from sound source 105 contains more than one musical note, only the most prominent one (i.e. the one owning the largest spectral peak) will be found.

Many vibrating objects—and some musical instruments—do not produce "musical notes" in the sense just defined; that is, they do not produce spectral peaks whose frequencies are integral multiples of a common fundamental. The simplest example is a tuning fork, which is a clamped-free beam satisfying the biharmonic equation. The spectral peak frequencies for such a vibrating object are not integral multiples of each other; for example, the second and third natural frequencies of the tuning fork are 6.267 and 17.55 times the fundamental. Such vibrations are well known in the art of Mechanical Engineering; see, for example, Cyril M. Harris and Charles E. Crede, *Shock and Vibration Handbook*, $2^{nd}$ *Edition*, pp. 7–11 to 7–15, which is herein incorporated by reference in its entirety. Nevertheless, many important acoustic musical instruments are described by the one-dimensional wave equation to a good approximation. For this equation, the natural frequencies (and therefore the peak frequencies of the musical instrument's power spectrum) are, in fact, integral multiples of a common fundamental. Consequently, Note Analysis 250 deals exclusively with this case. The integral-multiple frequencies are designated "overtones", and the multiple is designated the "overtone number". Thus the fundamental itself is designated "overtone 1", the octave above the fundamental is "overtone 2", etc.

It is important to recognize that the fundamental peak may actually be missing in the spectrum; the human ear/brain will nevertheless "hear" a note whose "pitch" is that fundamental frequency. For example, in FIG. 4, if the peak at 220 Hz were absent, the human ear/brain would still hear a "note" with pitch 220 Hz, because the array of overtones imply it. Note Analysis 250 must handle this "missing fundamental" case properly, because it commonly occurs, particularly in the lower ranges of acoustic musical instruments. In general, a "note" at frequency f will be heard if either (1) the fundamental at f is present and zero or more higher overtones are also present, or (2) the fundamental at f is absent and two or more higher overtones of f are present. Note Analysis 250 has been designed to handle both of these cases.

Figure 11A:
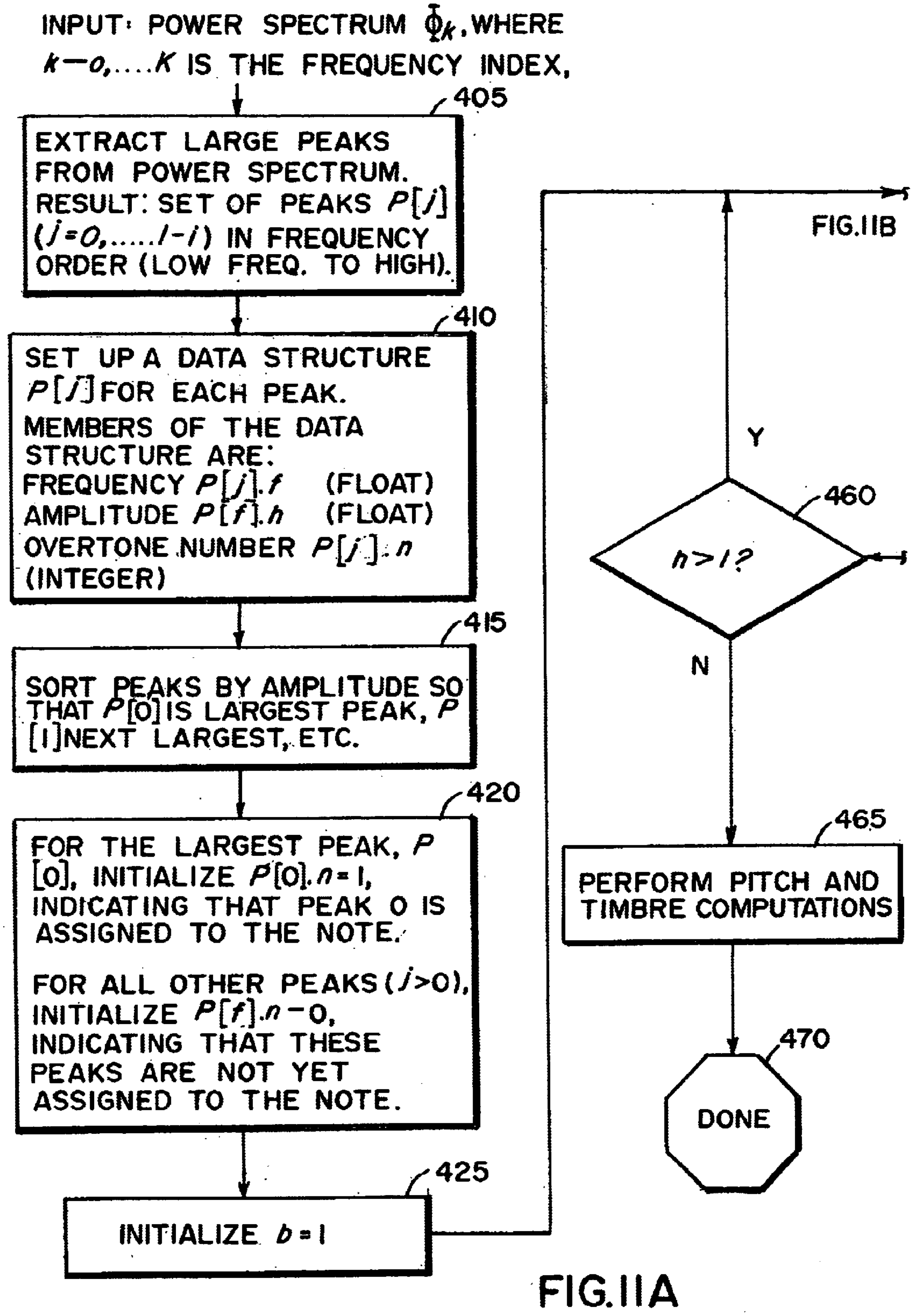
FIGS. 11A and 11B combined, depict a flow chart of the note analysis process.
Figure 11B:
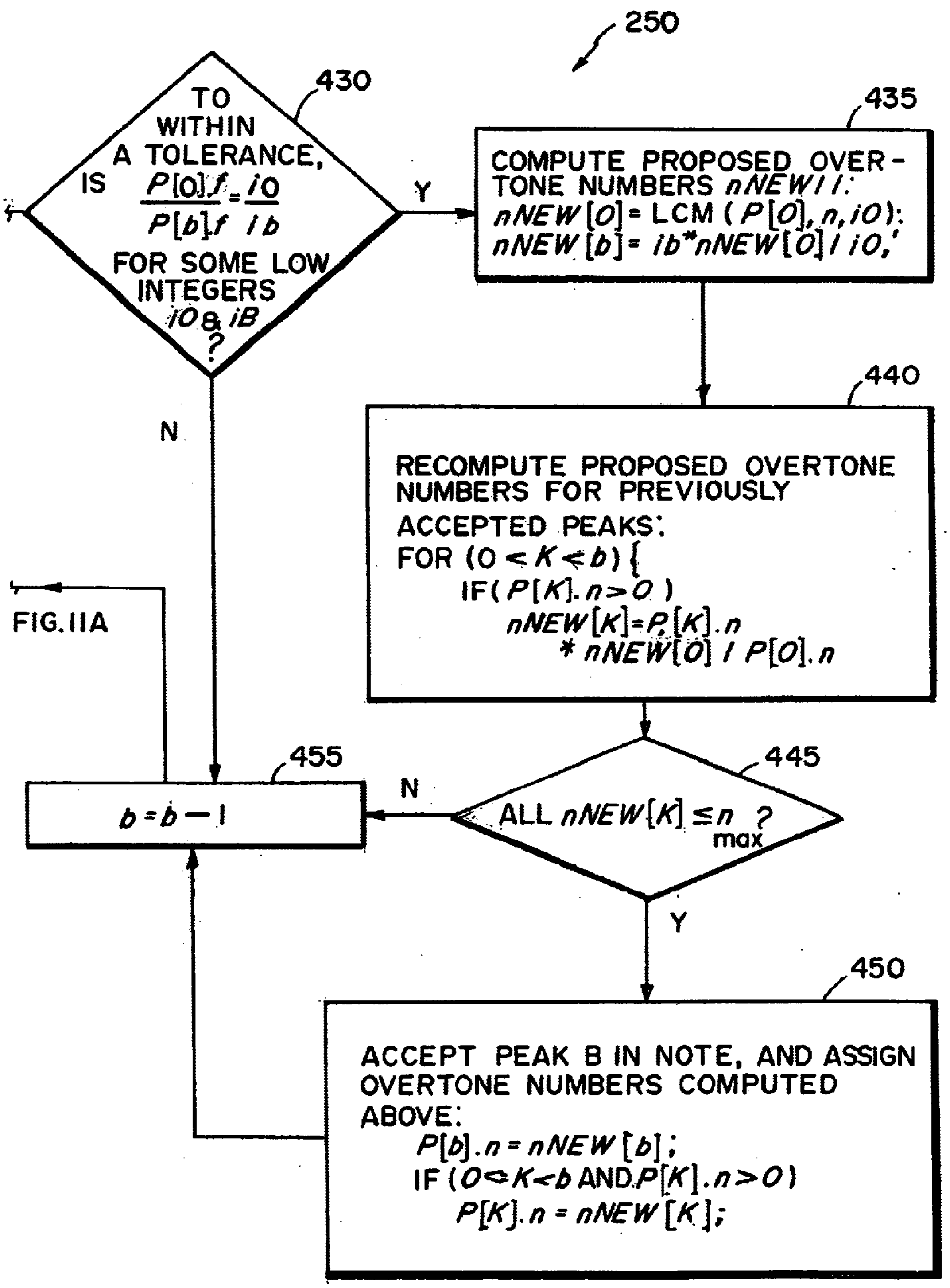

Refer to FIG. 11 for a detailed description of Note Analysis. In step 405, "peaks" are extracted from the series of numbers $\Phi(f_k)$; that is, values of k are sought for which $$\Phi(f_k)>\Phi(f_{k-1}) \text{ and } \Phi(f_k)>\Phi(f_{k-1}) \text{ and } \Phi(f_k)>\Phi_{min}. \tag{28a}$$

In other words, a value of Φ is a "peak" if it is bigger than both of its neighbors and also bigger than some user-defined threshold $\Phi_{min}$.

In one preferred embodiment of the invention, $\Phi_{min}$ is set to a user-selectable fraction β of the largest value in the array $\Phi(f_k)$, i.e.

$$\Phi_{min}=\beta\max\{\Phi(f_k)\}. \tag{28b}$$

The latter condition is useful to filter out noise and other small, insignificant local maxima. Suppose that J values of k, denoted $k_0, k_1, k_2, \ldots, k_{J-1}$ are found to satisfy the conditions in eq. (28). Thus $f_{k_j}$ is the frequency of the $j^{th}$ peak, and $\Phi(f_{k_j})$ is the amplitude of the $j^{th}$ peak, where j=0, 1, 2, . . . , J–1.

In step 410, a data structure P is set up for each of the J peaks found in step 405. Let P[j] denote the data structure for the $j^{th}$ peak, and let three members of each data structure be defined:

$P[i].f \equiv f_{k_j}$, the frequency of the $j^{th}$ peak (29a $P[j].h \equiv \Phi(f_{k_j})$, the amplitude of the $j^{th}$ peak (29b)

$P[j].n$, the overtone number of the $j^{th}$ peak, to be determined (29c)

The primary objective of note analysis is to determine which of the J peaks belong to the principle note contained in the sound, and for those that do belong, to determine the overtone numbers P[j].n.

Figure 4:
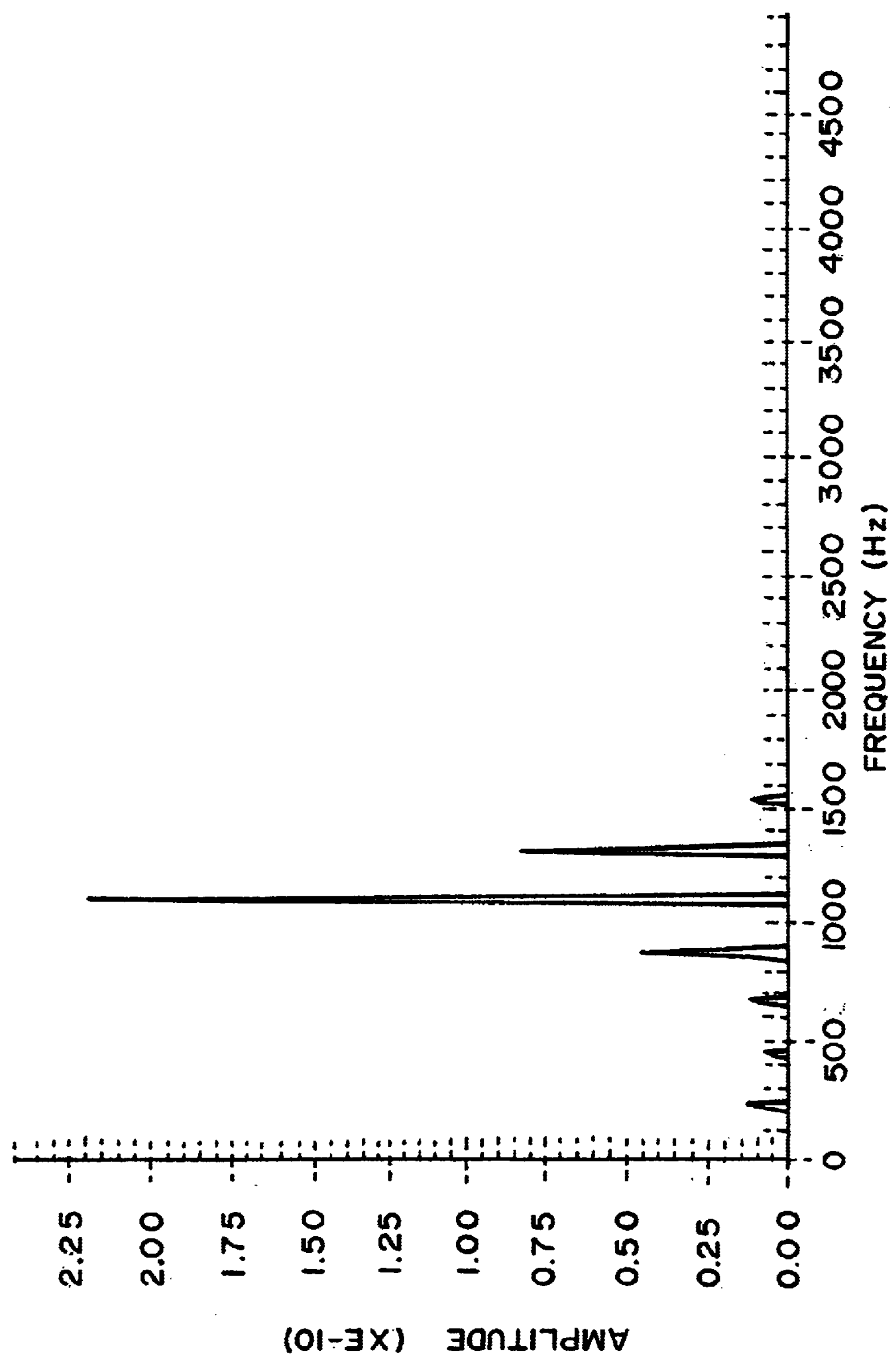
FIG. 4 is an example of the output produced by the LFD process.

In step 415, the peaks are sorted by amplitude so that P[0] refers to the peak with largest amplitude, P[1] refers to the peak with second-largest amplitude, and so on. In FIG. 4 for example, the peaks would be sorted so that P[0] referred to the peak at 1100 Hz, P[1] to the peak at 1320 Hz, P[2] to the peak at 880 Hz, etc.

In step 420, the overtone number for all peaks except the largest one are initialized to 0 (i.e. P[j].n=0 for j=1, . . . ,J), where 0 indicates that the peak has not yet been found to belong to the note. The overtone number of the largest peak is initialized to 1 (i.e. P[0].n=1), indicating that the largest peak is assigned to the note (n≠0), and is temporarily regarded as the fundamental (n=1). In FIG. 4 for example, the peak at 880 Hz would be assigned to the note and temporarily regarded as the fundamental.

In step 425, an integer index b is initialized to 1. Throughout the remainder of note analysis, b will represent the index of the peak currently under consideration (i.e. the peak being compared to peak 0) in the loop formed by Steps 430, 435, 440, 445, 450, 455, and 460. The reasons for the various computations in these seven steps, described below, are perhaps difficult to fathom without an example. Therefore, an example is given following the exposition.

In step 430, a series of tests is made to determine whether the ratio between the frequency of peak 0 and the frequency of peak b is close to the ratio between some pair of low, positive integers i0 and ib. That is, let (i0, ib) range over a two-dimensional array of positive integer pairs, starting with low integers and proceeding to higher ones, each dimension ranging from 1 to $n_{max}$. For each pair of integers, determine the truth of the following:

$$\left|\frac{P[0]\cdot f}{P[b]\cdot f} - \frac{i0}{ib}\right| < \delta, \tag{30}$$

where δ is a small tolerance. If such a pair of integers (i0, ib) is found to satisfy eq. (30), then the Note Analysis proceeds immediately to Step 435. Otherwise, if the entire two-dimensional array of integers in the range 1 to $n_{max}$ is exhausted without satisfying eq. (30), the analysis proceeds to Step 455.

In practice, $n_{max}$ should be a user-selectable parameter, but by default it may be 24 in a preferred embodiment. Clearly, $n_{max}$ cannot be infinite, because then the ratio of any two floating-point numbers in a computer would qualify as the ratio of two integers, since all numbers in a computer are rational, and the test (30) would be meaningless. The idea is to provide only for overtone numbers that are typically seen in practice. Using $n_{max}$=24 seems to be a good compromise.

The tolerance δ in test (30) should account for the fact that the difference on the left-hand side of the inequality may be attributable solely to the finite frequency granularity of the spectral analysis technique (i.e. DFT/FFT or LFD) that produced the power spectrum $\Phi(f_k)$. With this in mind, one preferred embodiment of the invention uses the following formulas for δ (wherein P[0].f is abbreviated $f_0$ and P[b].f is abbreviated $f_b$):

$$\delta = \frac{f_0 + \frac{\Delta f}{2}}{f_b - \frac{\Delta f}{2}} - \frac{f_0}{f_b} \text{ (for } DFT/FFT \text{ analysis)} \tag{31a}$$

-continued $$\delta = \frac{f_0 2^{1/2M}}{f_b 2^{-1/2M}} - \frac{f_0}{f_b} = \frac{f_0}{f_b}(2^{1/M} - 1) \text{ (for } LFD \text{ analysis)} \tag{31b}$$

As an example of the above (step 430), consider the spectrum shown in FIG. 4, which was obtained with LFD analysis using M=120 frequency divisions per octave. The actual peak frequencies for the two largest peaks are 1102.36 Hz and 1318.53 Hz respectively. These peaks, or course, represent overtones 5 and 6 of the note A220, but the computer doesn't know this a priori—it must discover the answer based on test (30). Using eq. (31b), test (30) for this case becomes $$\left|\frac{1102.36}{1318.53} - \frac{i0}{ib}\right| < \frac{1102.36}{1318.53}(2^{1/120} - 1), \tag{32a}$$

which reduces to $$\left|0.83605 - \frac{i0}{ib}\right| < 0.0048432. \tag{32b}$$

As the computer applies this test for various values of the integers i0 and ib, it encounters the case i0=5, ib=6, and finds that $$\left|0.83605 - \frac{5}{6}\right| < 0.0048432 \tag{32c}$$

is in fact satisfied, so the Note Analysis proceeds to step 435 with i0=5, ib=6.

In step 435, the values of i0 and ib obtained in step 430 are used to compute a proposed new overtone number for peak 0 that accommodates the new peak b, and also to compute a proposed overtone number for peak b itself. These computations are only "proposed" because peak b is not yet accepted into the note. If any of the proposed overtone numbers computed in steps 435 and 440 is too large, peak b will be rejected at step 445, and the proposed new overtone numbers will be discarded. The first computation in step 435 is to compute the proposed new overtone number for peak 0 as the lowest common multiple of the old value P[0].n and the integer i0 found in step 430:

$$n\text{New}[\mathbf{0}]=\text{LowestCommonMultiple}(P[\mathbf{0}].n,\ i\mathbf{0}). \tag{33b}$$

Next, compute the proposed new overtone number for peak b:

$$n\text{New}[b]=ib*n\text{New}[\mathbf{0}]/i\mathbf{0}. \tag{33c}$$

In step 440, the value of nNew[0] found in step 435 is used to compute proposed overtone numbers for peaks other than 0 and b (i.e. 0<k<b) that have previously been accepted into the note. Recall that P[k].n=0 means that peak k has not yet been accepted into the note, so the "previously accepted" condition is imposed by looking for peaks having P[k].n>0. Therefore, step 440 performs the following computation:

$$\text{for}(0<k<b)\{\text{if}(P[k].n>0)\ n\text{New}[k]=P[k].n*n\text{New}[\mathbf{0}]/P[\mathbf{0}].n\} \tag{34}$$

In step 445, the numbers nNew[ ] found in steps 435 and 440 are checked to see if any is larger than $n_{max}$, where $n_{max}$ is the user-selectable parameter discussed earlier in connection with eq. (30). That is, the new, smaller-amplitude peak b is rejected if its inclusion in the note would imply that the overtone number n for any of the previously accepted, larger-amplitude peaks would be unreasonably high. If peak b is rejected on this basis, then the Note Analysis proceeds from step 445 to step 455; otherwise, it proceeds to step 450.

In step, peak b is accepted into the note by copying the proposed overtone numbers nNew[ ] found in steps 435 and 440 into the data structure P[b]. Thus, the following computations are performed:

$$P[b].n=n\text{New}[b] \tag{35a}$$

$$\text{for}(0\leq k<b)\{\text{if}(P[k].n>0)P[\text{k}].n=n\text{New}[k]\}. \tag{35b}$$

In step 455, the peak index b is incremented by 1, thereby preparing to consider the next peak in the amplitude-sorted list on the next iteration of the loop containing steps 430 through 460.

In step 460, the newly incremented value of b is tested to see if the end of the J-element list of peaks P[j] has been reached. If so, computation proceeds to step 465; otherwise, steps 430 through 460 are repeated.

Before proceeding to a discussion of step 465, consider the following example that illustrates steps 430 through 460 described above. Suppose, on entry to step 420, that a spectrum has been found to contain the following six peaks:

TABLE 2

Example Spectrum to Illustrate Note Analysis Steps 430 through 460

| Peak Index j | Amplitude (arbitrary units) | Peak Frequency P[j].f (Hz) | Overtone Number P[j].n |
|---|---|---|---|
| 0 | 64 | 603 | |
| 1 | 56 | 302 | |
| 2 | 41 | 198 | |
| 3 | 29 | 450 | |
| 4 | 21 | 320 | |
| 5 | 16 | 99 | |

The task of steps 430 through 460 is to fill in the last column of Table 2 via pair-wise comparison of the peaks. Since this example has been contrived to illustrate the various features of steps 430–460, it should be obvious that all peaks except 4 have been chosen to have frequencies close to multiples of 50 Hz. Therefore, the expected result for the last column of the table is as shown in Table 3, wherein P[4].n=0 implies that peak 4 does not belong to the note. It is expected that all other peaks will be accepted into the note and recognized as the overtones numbers given in the last column.

TABLE 3

Example Spectrum with Expected Answer for Overtone Numbers

| Peak Index j | Amplitude (arbitrary units) | Peak Frequency P[j].f (Hz) | Overtone Number P[j].n |
|---|---|---|---|
| 0 | 64 | 603 | 12 |
| 1 | 56 | 302 | 6 |
| 2 | 41 | 198 | 4 |
| 3 | 29 | 450 | 9 |
| 4 | 21 | 320 | 0 |
| 5 | 16 | 99 | 2 |

In pursuit of the result shown in the last column of Table 3, step 420 begins by artificially filing in the last column as shown in Table 4. In this Table and those that follow, the "Amplitude" column is omitted because, inasmuch as the array of peaks P[ ] is already sorted by amplitude, it is unneeded for the analysis of overtone numbers.

TABLE 4

| Artificial Initialization of Overtone Numbers in Step 4. | | |
|---|---|---|
| Peak Index j | Peak Frequency P[j].f (Hz) | Overtone Number P[j].n |
| 0 | 603 | 1 |
| 1 | 302 | 0 |
| 2 | 198 | 0 |
| 3 | 450 | 0 |
| 4 | 320 | 0 |
| 5 | 99 | 0 |

The initialization of overtone numbers shown in Table 4 implies that the largest peak (j=0) is automatically accepted into the note, and is tentatively considered the fundamental (overtone 1). The other peaks, pending the pair-wise comparisons below, are tentatively considered not to belong to the note, as indicated by the flag n =0.

On the first iteration of the loop (steps 430 through 460), with b=1, peaks 0 and 1 are compared. Step 430 asks, using eq. (30), if the frequency ratio 603/302 is close to a ratio of two small integers i0/ib within the tolerance given by equations (31). Suppose the tolerance is such that the answer is yes: i0=2, ib=1. Then step 435 computes, via eqs. (33), $$n\text{New}[\mathbf{0}]=\text{LowestCommonMultiple}(1, 2)=2 \quad (36a)$$

$$n\text{New}[\mathbf{1}]=1*2/2=1. \quad (36b)$$

Step 440 requires no computation in this case, because there are no "previously accepted peaks", so the contents of the "for" loop on eq. (34) is never executed. Since neither value of nNew[ ] in eqs. (36) exceeds $n_{max}$=24, peak 1 is accepted into the note (step 445 succeeds). Thus, step 450 is executed, writing the new results into the data structure:

$$P[\mathbf{0}].n=2;\ P[\mathbf{1}].n=1. \quad (37)$$

In other words, the note is now regarded as containing two peaks, 0 and 1, with overtone numbers as shown in Table 5. This implies that the fundamental frequency of the note is now believed to be roughly 300 Hz.

TABLE 5

| Result after pairwise comparison of peaks (0, 1) | | |
|---|---|---|
| Peak Index j | Peak Frequency P[j].f (Hz) | Overtone Number P[j].n |
| 0 | 603 | 2 |
| 1 | 302 | 1 |
| 2 | 198 | 0 |
| 3 | 450 | 0 |
| 4 | 320 | 0 |
| 5 | 99 | 0 |

On the second iteration of the loop, with b=2, peaks 0 and 2 are compared. Analogous to the first iteration, the ratio test in step 430, using eq. (30), finds 603/198 is approximately equal to 3/1, so i0=3, ib=1. Then step 435 computes, via eqs. (33), $$n\text{New}[\mathbf{0}]=\text{LowestCommonMultiple}(2, 3)=6 \quad (38a)$$

$$n\text{New}[2]=1*6/3=2. \quad (38b)$$

Step 440 adjusts the overtone number of the previously accepted peak 1 in accordance with eq. (34):

$$n\text{New}[\mathbf{1}]=1*6/2=3. \quad (38c)$$

Since none of the values of nNew[ ] in eqs. (38) exceeds $n_{max}$=24, peak 2 is accepted lo into the note (step 445 succeeds). Thus, step 450 is executed, writing the new results into the data structure:

$$P[\mathbf{0}].n=6;\ P[\mathbf{1}].n=3;\ P[\mathbf{2}].n=2;. \quad (39)$$

In other words, the note is now regarded as containing three peaks, 0, 1, and 2, with overtone numbers as shown in Table 6. The fundamental is now believed to be approximately 100 Hz, even though no peak has yet been encountered, in the pairwise comparisons, corresponding to that frequency.

TABLE 6

| Result after pair-wise comparison of peaks (0, 2) | | |
|---|---|---|
| Peak Index j | Peak Frequency P[j].f (Hz) | Overtone Number P[j].n |
| 0 | 603 | 6 |
| 1 | 302 | 3 |
| 2 | 198 | 2 |
| 3 | 450 | 0 |
| 4 | 320 | 0 |
| 5 | 99 | 0 |

On the third iteration of the loop, with b=3, peaks 0 and 3 are compared. Analogous to the first iteration, the ratio test in step 430, using eq. (30), finds that 603/450 is approximately equal to 4/3, so i0=4, ib=3. Then step 435 computes, via eqs. (33), $$n\text{New}[\mathbf{0}]=\text{LowestCommonMultiple}(6, 4)=12 \quad (40a)$$

$$n\text{New}[\mathbf{3}]=3*12/4=9. \quad (40b)$$

Step 440 adjusts the overtone numbers of the previously accepted peaks 1 and 2 in accordance with eq. (34):

$$n\text{New}[\mathbf{1}]=3*12/6=6 \quad (40c)$$

$$n\text{New}[\mathbf{2}]=2*12/6=4. \quad (40d)$$

Since none of the four values of nNew[ 9 in eqs. (38) exceeds $n_{max}$=24, peak 3 is accepted into the note. Thus step 450 is executed , writing the new results into the data structure:

$$P[\mathbf{0}].n=12;\ P[\mathbf{1}].n=6;\ P[\mathbf{2}].n=4;\ P[\mathbf{3}].n=9\ .$$

In other words, the note is now regarded as containing four peaks, 0, 1, 2, and 3, with overtone numbers as shown in Table 7. The fundamental is now believed to be approximately 50 Hz.

TABLE 7

| Result after pair-wise comparison of peaks (0, 3) | | |
|---|---|---|
| Peak Index j | Peak Frequency P[j].f (Hz) | Overtone Number P[j].n |
| 0 | 603 | 12 |
| 1 | 302 | 6 |
| 2 | 198 | 4 |
| 3 | 450 | 9 |
| 4 | 320 | 0 |
| 5 | 99 | 0 |

On the fourth iteration of the loop, with b=4, peaks 0 and 4 are compared. Analogous to the first iteration, the ratio test in step 430, using eq. (30), finds that 603/320 is approximately equal to 15/8, so i0=15, ib=8.

Then step 435 computes, via eqs. (33), $$nNew[\mathbf{0}]=\text{LowestCommonMultiple}(12, 15)=60 \quad (41a)$$

$$nNew[\mathbf{4}]=13*60/15=52. \quad (41b)$$

Step 440 adjust the overtone numbers of the previously accepted peaks 1, 2, and 3 in accordance with eq. (34):

$$nNew[\mathbf{1}]=6*60/12=30 \quad (41c)$$

$$nNew[\mathbf{2}]=4*60/12=20 \quad (41d)$$

$$nNew[\mathbf{3}]=9*60/12=45. \quad (41e)$$

However, the test in step 445 fails, since nNew[0]=60 exceeds $n_{max}$=24. The values of nNew[1], nNew[3], and nNew[4] also exceed $n_{max}$; any one of these would cause the test in step 445 to fail. Therefore, peak 4 is rejected as not properly belonging to the note, and the overtone numbers computed in eqs. (41) are discarded. Thus, the table is unchanged except to emphasize that peak 4 has been discarded, as indicated by the bold 0 in Table 8. The fundamental is still believed to be approximately 50 Hz.

TABLE 8

Result after pair-wise comparison of peaks (0, 4)

| Peak Index j | Peak Frequency P[j].f (Hz) | Overtone Number P[j].n |
|---|---|---|
| 0 | 603 | 12 |
| 1 | 302 | 6 |
| 2 | 198 | 4 |
| 3 | 450 | 9 |
| 4 | 320 | 0 |
| 5 | 99 | 0 |

On the fifth and final iteration of the loop, with b=5, peaks 0 and 5 are compared. Analogous to previous iterations, the ratio test in step 430, using eq. (30) finds that 603/99 is approximately equal to 6/1, so i0=6, ib=1. Then step 435 computes $$nNew[\mathbf{0}]=\text{LowestCommonMultiple}(12, 6)=12 \quad (42a)$$

$$nNew[\mathbf{5}]=1*12/6=2, \quad (42b)$$

and step 440 computes $$nNew[\mathbf{1}]=6*12/12=6 \quad (42c)$$

$$nNew[\mathbf{2}]=4*12/12=4 \quad (42d)$$

$$nNew[\mathbf{3}]=9*12/12=9. \quad (42e)$$

Since none of the five values of nNew[ ] in eqs. (42) exceeds $n_{max}$=20, peak 5 is accepted into the note. Thus, step 450 is executed, writing the new results into the data structure:

$$P[\mathbf{0}].n=12;\ P[\mathbf{1}].n=6;\ P[\mathbf{2}].n=4;\ P[\mathbf{3}].n=9;\ P[\mathbf{5}].n=2.$$

Actually, nothing changes for the previously accepted peaks; the only new result is P[5].n. The final result is Table 3, as expected. Thus the note finally contains 5 peaks, and the fundamental is believed to be approximately 50 Hz, even though no spectral peak exists at that frequency. Thus, this example illustrates explicitly how the Note Analysis can deal with the case of a missing fundamental, as described earlier just prior to eq. (28).

In step 465, the pitch and timbre of the note are determined from the frequencies, overtone numbers, and amplitudes of the peaks it comprises, as determined in earlier steps of the analysis.

Let $f_j$ be the vector of frequencies P[j].f of the L spectral peaks comprising the note, let $n_j$ be the corresponding vector of overtone numbers P[j].n found in steps 430 through 460, and let $\Phi_j$ be the corresponding vector of spectral amplitudes P[j].h, where j=0, . . . , L−1.

For example, using the case given above in Table 3, L=5 (not 6, because peak 4 does not belong to the note), and the vectors are as follows:

$$f_j=(603, 302, 198, 450, 99) \quad (43a)$$

$$n_j=(12, 6, 4, 9, 2). \quad (43b)$$

$$\Phi_j=(64, 56, 41, 29, 16) \quad (43c)$$

The "pitch" of the sound, in units of Hz, may be computed from these three arrays. In one preferred embodiment of the invention, pitch is defined as follows:

$$\text{Pitch} \equiv \frac{\sum_{j=0}^{L-1} \Phi_j \left(\frac{f_j}{n_j}\right)}{\sum_{j=0}^{L-1} \Phi_j} \quad (44)$$

This definition states that the pitch of a note is the amplitude-weighted average of the estimates, $f_j/n_j$, that the various spectral peaks make of the fundamental frequency.

For example, using the case given by eqs. (43), these various estimates of the fundamental frequency are 603/12, 302/6, 198/4, 450/9 and 99/2, each of which is near 50 Hz. Applying (44) to compute a weighted average of these estimates:

$$\text{Pitch} = \frac{64\left(\frac{603}{12}\right) + 56\left(\frac{302}{6}\right) + 41\left(\frac{198}{4}\right) + 29\left(\frac{450}{9}\right) + 16\left(\frac{99}{2}\right)}{64 + 56 + 41 + 29 + 16} = 50.03 \text{ Hz.} \quad (45)$$

As expected, the computed pitch is near 50 Hz.

In step 465, the timbre of the note is also computed from the arrays $n_j$ and $\Phi_j$. In reality, "timbre" is a complex, difficult-to-define term that includes transient characteristics of a sound such as attack and decay. However, in one preferred embodiment of this invention, timbre for a steady-state note is defined simply as a vector $Q \equiv (Q_1, Q_2, \ldots, Qn_{Max})$ of normalized overtone amplitudes, where $n_{max}$ is the user-selectable parameter discussed earlier in connection with eq. (30). That is, $$Q_{n_j} = \frac{\Phi_j}{\Phi_{max}}, \quad j = 0, \ldots, L-1 \quad (46)$$

where elements of Q not represented in (46) (because the vector $n_j$ only contains certain integers) are assigned the value 0.

For example, using the case given by eqs. (43), the non-zero elements of Q in eq. (46) are $$Q_{12}=64/64=1.00, \quad (47a)$$

$$Q_6=56/64=0.875, \quad (47b)$$

$$Q_4=41/64=0.641, \quad (47c)$$

$$Q_9=29/64=0.453, \quad (47d)$$

$$Q_2=16/64=0.250, \quad (47e)$$

and all other elements are zero. Thus the "timbre" of this note is represented by the vector $$Q=(0.0, 0.250, 0.0, 0.641, 0.0, 0.875, 0.0, 0.0, 0.453, 0.0, 0.0, 1.00, 0.0, 0.0, \ldots, 0.0).$$

I claim:

1. A system for analyzing an acoustic spectrum comprising:

a computer with one or more memories and one or more central processing units;

an audio input device that acquires an audio waveform in the time domain;

means for conducting a spectral analysis process that evaluates the frequency content of the audio waveform at one or more discrete evaluation frequencies, the spectral-analysis process determining at each evaluation frequency a spectral amplitude representing the power spectral density of the waveform at the respective frequency, this set of spectral amplitudes versus frequency being called a power spectrum;

a note analysis process that identifies a set of peaks in the power spectrum, finds low-integer relationships between the frequency of the peaks, and thereby determines which of the peaks belongs to a note contained in the audio waveform;

wherein said note analysis process comprises the following steps:

a. selecting the largest peak into a set of overtones comprising the note;

b. sequentially comparing a candidate peak not yet in the set to those already in the set, said sequential comparisons being done in order of decreasing amplitude of the candidate peaks;

c. for each of the comparisons, selecting the candidate peak into the set of overtones if and only if the candidate peak's frequency as well as the frequencies of all peaks already in the set are low-integer multiples of a common fundamental frequency, within a tolerance.

2. The system as in claim 1 where each of the overtones is given an integer overtone number that specifies approximately the ration between the overtone's frequency and the common fundamental frequency.

3. A system, as in claim 2, where a pitch of the note is determined as a weighted average of the estimates which the various overtones in the note make of the note's fundamental frequency, this estimate being an overtone's frequency divided by its overtone number.

4. A system, as in claim 3, where the average is weighted by the spectral amplitudes.

5. A system, as in claim 4, where the average is given by:

$$\text{Pitch} \equiv \frac{\sum_{j=0}^{L-1} \Phi_j \left(\frac{f_j}{n_j}\right)}{\sum_{j=0}^{L-1} \Phi_j},$$

where L is the number of peaks in the set, and $\Phi_j$, $f_j$, and $n_j$ are respectively the amplitude, frequency, and overtone number of the $j^{th}$ peak in the set.

6. A system, as in claim 3, further comprising a computer display unit, upon which values of pitch obtained sequentially in time are displayed in the manner of a strip-chart recording, each value of pitch being presented as a data point on a graph of logarithmically scaled frequency versus time, and the data points being accumulated on the displayed graph as time progresses, so that a user can see a history of pitch versus time.

7. A system, as in claim 3, further comprising a computer display unit, upon which the vector of numbers representing the timbre of the note is displayed in the manner of a bar-chart, the height of the $i^{th}$ bar representing the amplitude of overtone i, such that a user can see directly, for the sampled waveform most recently acquired, the overtone content of the sound, and by observing the bar chart in real time, can see how the overtone content of the sound changes over time.

8. A system, as in claim 3, further comprising a computer display unit, upon which values of pitch are displayed as notes on a musical staff, each note's pitch to the nearest semitone being indicated by the note's location on the staff, as in standard musical notation, and the note's exact pitch within the semitone being indicated by the color of the note as displayed on the computer display unit.

9. A system, as in claim 3, further comprising a computer display unit, upon which values of pitch are displayed as notes on a musical staff, each note's pitch to the nearest semitone being indicated by the note's location on the staff, as in standard musical notation, and the note's exact pitch within the semitone being indicated by the shape of the note as displayed on the computer display unit.

10. The system as in claim 1 where for each of the comparisons, the candidate peak is selected into the set only if the low-integer multiples can be found in the range 1 through 24.

11. The system as in claim 1 where a timbre of the note is determined from the amplitudes and overtone numbers of the peaks in the set of overtones.

12. A system, as in claim 11, where the timbre is given by a vector of numbers whose $i^{th}$ element is non-zero only if the overtone number i appears in the set of overtones, and in that case the element of the vector is equal to the overtone's amplitude divided by the largest amplitude in the set of overtones.

13. A computer system comprising:

one or more central processing units and one or more memories, said computer system further comprising:

an audio input device that acquires an audio waveform in the time domain and samples the audio waveform periodically at a sampling rate to produce one or more sampled wave forms in a temporal sequence, each sampled waveform comprising one or more discrete samples at a respective sample time;

means for conducting a spectral analysis process that evaluates a power spectral density of each waveform at a set of one or more discrete evaluation frequencies, the evaluation being evenly and logarithmically distributed over a frequency range, the spectral-analysis process determining at each evaluation frequency a spectral amplitude representing the power spectral density of the waveform at the respective evaluation frequency, this set of spectral amplitudes versus frequency being called a power spectrum;

means for conducting a note analysis process that identifies a set of peaks in the power spectrum, which finds low-integer relationships between the frequency of the peaks, and thereby determines which of the peaks belongs to a note contained in the audio waveform;

wherein said note analysis process comprises the following steps:

a. selecting the largest peak into a set of overtones comprising the note;

b. sequentially comparing a candidate peak not yet in the set to those already in the set, said sequential comparisons being done in order of decreasing amplitude of the candidate peaks;

c. for each of the comparisons, selecting the candidate peak into the set of overtones if and only if the candidate peak's frequency as well as the frequencies of all peaks already in the set are low-integer multiples of a common fundamental frequency, within a tolerance.

14. A system, as in claim 13, where the number of evaluation frequencies is fewer than the number of discrete samples.

15. The system as in claim 13, where the number of evaluation frequencies in said set of discrete evaluation frequencies is greater than or equal to the number of discrete samples.

16. A system, as in claim 13, where the evaluation frequencies are given by $$f[k]=f_0 2^{k/M}$$

where $f_0$ is a specified minimum frequency, k is an index identifying the respective evaluation frequency, and M is an integer specifying the number of evaluation frequencies per octave.

17. A system as in claim 16, where $f_0$ is a "true" musical note on an equally tempered scale.

18. A system, as in claim 16, where $f_0=(440)2^{s/12}$ for some integer s, where s is any one of the following values: a positive value, a negative value, and a zero value.

19. A system, as in claim 18, where M=12 m for some positive integer m, where m specifies the number of evaluation frequencies per half-step in a 12-tone system of music.

* * * * *